United States Patent
Zhang et al.

(10) Patent No.: US 9,832,746 B2
(45) Date of Patent: Nov. 28, 2017

(54) ENHANCED MECHANISM OF UPLINK TIME ALIGNMENT MAINTENANCE FOR INTER-ENB CARRIER AGGREGATION

(71) Applicant: MEDIATEK Singapore Pte. Ltd., Singapore (SG)

(72) Inventors: Yuanyuan Zhang, Beijing (CN); Per Johan Mikael Johansson, Kungsangen (SE); Li Chen, Beijing (CN)

(73) Assignee: MEDIATEK SINGAPORE Pte. Ltd., Singapore (SG)

( * ) Notice: Subject to any disclaimer, the term of this patent is extended or adjusted under 35 U.S.C. 154(b) by 115 days.

(21) Appl. No.: 14/808,126

(22) Filed: Jul. 24, 2015

(65) Prior Publication Data

US 2015/0334669 A1  Nov. 19, 2015

Related U.S. Application Data

(63) Continuation of application No. PCT/CN2014/071388, filed on Jan. 24, 2014.

(30) Foreign Application Priority Data

Jan. 25, 2013  (CN) .......................... 2013 1 0029511

(51) Int. Cl.
*H04W 56/00* (2009.01)
*H04L 5/00* (2006.01)
*H04L 27/26* (2006.01)

(52) U.S. Cl.
CPC ......... *H04W 56/0005* (2013.01); *H04L 5/001* (2013.01); *H04L 27/2646* (2013.01);
(Continued)

(58) Field of Classification Search
CPC ......... H04W 56/0005; H04W 56/0045; H04W 56/001; H04W 56/002; H04L 27/2646;
(Continued)

(56) References Cited

U.S. PATENT DOCUMENTS

2011/0111789 A1* 5/2011 Lee .................. H04W 52/42
                                        455/522
2012/0063425 A1  3/2012 Wang et al. .......... 370/336
(Continued)

FOREIGN PATENT DOCUMENTS

CN  101888648 A  5/2009
CN  101646234 A  9/2009
(Continued)

OTHER PUBLICATIONS

International Search Report and Written Opinion of International Search Authority for PCT/CN2014/071388 dated Jun. 24, 2014 (12 pages).
(Continued)

*Primary Examiner* — Christine Ng
(74) *Attorney, Agent, or Firm* — Imperium Patent Works; Zheng Jin; Helen Mao

(57) ABSTRACT

Apparatus and method are provided to configure two-tier identifiers for serving cells of a UE configured with inter-eNB carrier aggregation (CA). In one novel aspect, cell group identifiers are configured. The cell group identifier is a super set of one or more uplink group identifiers that are associated with serving cells served by the same base station. In one embodiment, different MAC entities are associated with different cell group identifiers. The UE performs uplink alignment, monitoring and management procedures linking to the cell group identifier. In another novel aspect, a group TAG, which is a super set identifier of one or more cell TAGs associated with serving cells served by the same base station, is configured. In one embodiment, the UE performs uplink alignment procedure based on the status of the group TAG, which is determined based on the status of the cell TAGs associated with the group TAG.

20 Claims, 11 Drawing Sheets

(52) U.S. Cl.
CPC ....... *H04W 56/0045* (2013.01); *H04L 5/0023* (2013.01); *H04L 5/0035* (2013.01); *H04L 5/0092* (2013.01)

(58) Field of Classification Search
CPC ..... H04L 5/001; H04L 5/0023; H04L 5/0035; H04L 5/0092
USPC .................................. 370/328, 338, 350, 401
See application file for complete search history.

(56) References Cited

U.S. PATENT DOCUMENTS

| | | | | |
|---|---|---|---|---|
| 2012/0177010 A1* | 7/2012 | Huang | .................. | H04W 4/021 370/335 |
| 2012/0300714 A1 | 11/2012 | Ng et al. | ........................ | 370/329 |
| 2013/0250881 A1* | 9/2013 | Liao | ...................... | H04W 36/08 370/329 |
| 2013/0250925 A1 | 9/2013 | Löhr et al. | ..................... | 370/336 |
| 2014/0119304 A1* | 5/2014 | Li | ....................... | H04W 52/146 370/329 |
| 2014/0161110 A1 | 6/2014 | Kim et al. | ..................... | 370/336 |
| 2014/0177555 A1* | 6/2014 | Ng | ..................... | H04W 72/0406 370/329 |
| 2014/0177560 A1* | 6/2014 | Guo | .................. | H04W 72/1268 370/329 |
| 2014/0192775 A1* | 7/2014 | Li | ..................... | H04W 36/0072 370/331 |

FOREIGN PATENT DOCUMENTS

| | | |
|---|---|---|
| WO | WO2013009136 A2 | 7/2011 |
| WO | WO2012041422 A2 | 4/2012 |

OTHER PUBLICATIONS

EPO, Search Report for the EP patent application 14743150.6 dated Aug. 26, 2016 (10 pages).

* cited by examiner

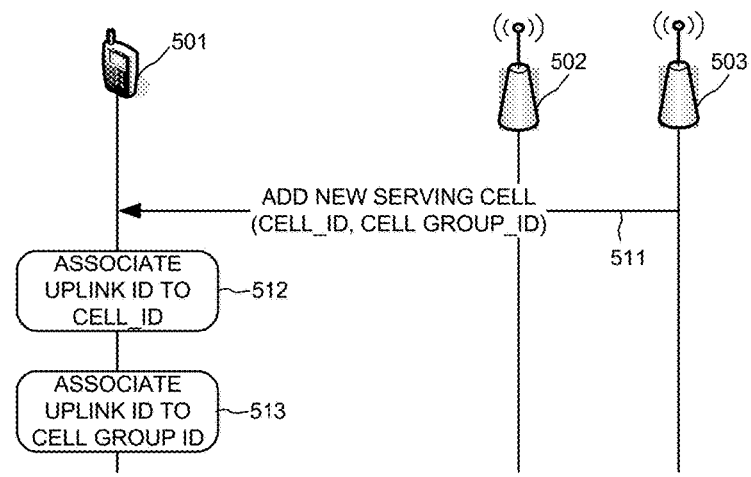
FIG. 5
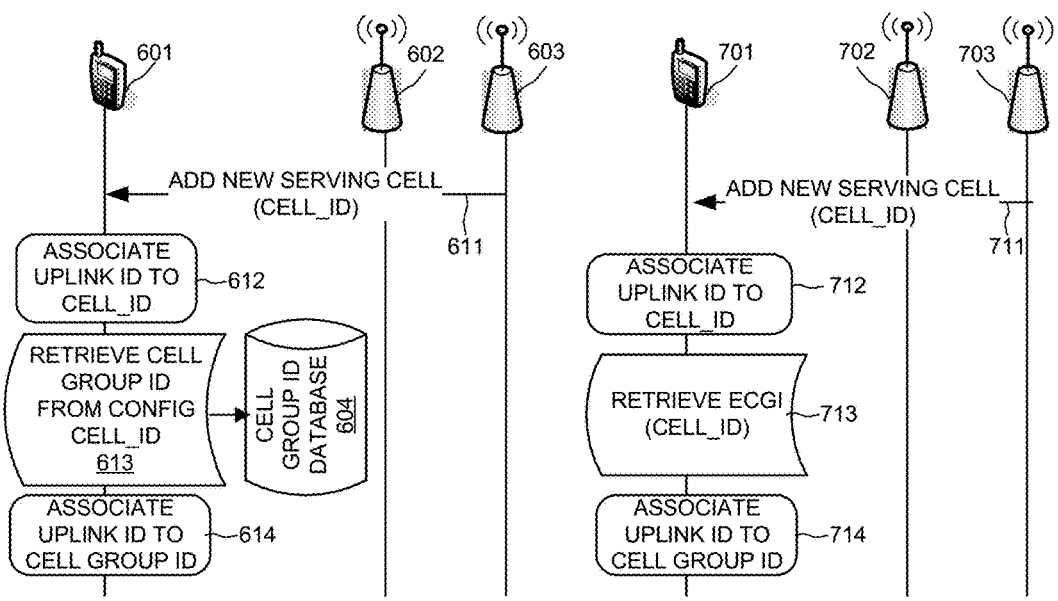
FIG. 6
FIG. 7

ENHANCED MECHANISM OF UPLINK TIME ALIGNMENT MAINTENANCE FOR INTER-ENB CARRIER AGGREGATION

CROSS REFERENCE TO RELATED APPLICATIONS

This application is filed under 35 U.S.C. §111(a) and is based on and hereby claims priority under 35 U.S.C. §120 and §365(c) from International Application No. PCT/CN2014/071388, with an international filing date of Jan. 24, 2014, which in turn claims priority from Chinese Application No. 201310029511.1, filed on Jan. 25, 2013. This application is a continuation of International Application No. PCT/CN2014/071388, which claims priority from Chinese Application No. 201310029511.1. International Application No. PCT/CN2014/071388 is pending as of the filing date of this application, and the United States is a designated state in International Application No. PCT/CN2014/071388. This application claims the benefit under 35 U.S.C. §119 from Chinese Application No. 201310029511.1. The disclosure of each of the foregoing documents is incorporated herein by reference.

TECHNICAL FIELD

The disclosed embodiments relate generally to wireless communication systems, and, more particularly, to enhancing uplink time alignment maintenance for inter-eNB carrier aggregation.

BACKGROUND

A Long-Term Evolution (LTE) system offers high peak data rates, low latency, improved system capacity, and low operating cost resulting from simplified network architecture. LTE systems also provide seamless integration to older wireless network, such as GSM, CDMA and Universal Mobile Telecommunication System (UMTS). In LTE systems, an evolved universal terrestrial radio access network (E-UTRAN) includes a plurality of base stations, e.g., evolved Node-Bs (eNBs) communicating with a plurality of mobile stations referred as user equipments (UEs).

Discrete Fourier Transform (DFT) spread orthogonal frequency division multiplex (OFDM) is an uplink transmission scheme of LTE. The DFTS-OFDM-based LTE uplink transmission scheme allows for uplink transmissions received from different UEs within a cell do not cause interference to each other. To achieve this intra-cell orthogonality, it requires uplink alignment from different UEs. LTE includes timing advance mechanism to ensure the uplink alignment. When a UE needs to establish a RRC connection with an eNB, the UE transmits a Random Access Preamble. Upon receiving it, the eNB estimates the transmission timing of the UE. The network controls the uplink alignment by responding with a Random Access Response that consists of timing advance command (TAC). The timing advance compensates for the propagation delay between the eNB and the UE and varies with time, due to UE mobility. During TA maintenance phase, the eNB measures the timing of the received UL data and adjusts the UL timing by TA command. The UE tracks the validity of its UL timing by means of a timing alignment timer (TAT). The network determines the timing-advance value for each UE.

Carrier aggregation (CA) is introduced to improve system throughput. With carrier aggregation, the LTE-Advance system can support peak target data rates in excess of 1 Gbps in the downlink (DL) and 500 Mbps in the uplink (UL). Such technology is attractive because it allows operators to aggregate several smaller contiguous or non-continuous component carriers (CC) to provide a larger system bandwidth, and provides backward compatibility by allowing legacy users to access the system by using one of the component carriers.

With Carrier aggregation, a single UE may be assigned radio resources on more than one CC. In some cases, multiple CCs share the same timing advance value and belong to the same timing advance group. In other cases, multiple CCs have different timing advance values and belong to different timing advance group (TAG). This is because the DL receptions of different CCs are from different propagation paths. If the time difference between the different paths is larger than a threshold, then the delay becomes non-negligible. As a result, multiple timing advance groups are required such that different timing advance values are applied to different CCs to avoid inter-symbol interference. In one example, the need for different timing advance may arise due to inter-band carrier aggregation, or when transmission for one band is routed via a frequency selective repeater while transmission for another band is not. In another example, DL signals of different bands are routed through different source nodes, such as remote radio heads (RRH) located some distance apart.

Inter-eNB carrier aggregation is introduced in the recent development of LTE. Inter-eNB carrier aggregation is configured to enable the UE to perform normal data transmission and reception through multiple serving cells originated from different eNBs or different sets of co-located antennas. LTE introduces small cell network. The small cell network includes small eNBs with low transmission power and simplified protocol stacks/functionalities together with the normal eNBs. The small cell architecture enhances data throughput and reduces the mobility signaling overhead. In an anchor-based small cell network, a UE is housed in an eNB, which is referred to as an anchor eNB of the UE. UE anchor is UE specific, a UE anchor is a point where the Core Network connection of the UE is terminated, that does not have to be relocated when the UE moves in a local area covered by cells of multiple base-stations. UE serving cell(s) can be controlled by an eNB that is different from the anchor eNB, which is referred to as a drift eNB of the UE. When the UE is served by both anchor eNB and drift eNB, the control of the UE and the user plane functionality is split between the anchor eNB and the drift eNB.

Inter-eNB carrier aggregation requires new approaches for uplink alignment, monitoring and management. When a UE is configured with inter-eNB carrier aggregation, the UE performs normal data transmission/reception through multiple serving cells originating from different eNBs or different set of co-located antennas. Although these eNBs provide services together to the UE at the same time, the same eNBs may serve multiple UEs at the same time. Therefore, each eNB has to guarantee that the uplink transmissions from different UEs are time-aligned. This is different from the existing intra-eNB carrier aggregation when only one eNB is responsible for the uplink channel and timing-advance value to the UE. Further, for inter-eNB carrier aggregation, UE needs to handle TACs coming from different eNBs or different sets of antennas. Inter-eNB carrier aggregation also provides advantages such that when one eNB is out of synchronization, the network can select a different eNB to continue provide data transmissions. Therefore, unlike intra-cell carrier aggregation, when one TAG is out of synchronization, the UE can continue its data transmission through another eNB.

Inter-eNB carrier aggregation requires enhanced mechanisms for uplink alignment, monitoring and management. The current invention provides enhanced mechanisms to handle uplink alignment, monitoring and management procedures for inter-eNB carrier aggregation.

SUMMARY

Apparatus and method are provided to configure two-tier identifiers for serving cells of a UE configured with inter-eNB carrier aggregation.

In a first novel aspect, the UE detects an inter-eNB carrier aggregation in a wireless network with serving cells served by a first and a second base station, wherein each serving cell is configured with an uplink group identifier. The UE determines a first cell group with a first cell group identifier containing one or more serving cells with the same or different uplink group identifiers served by the first base station. The UE determines a second cell group with a second cell group identifier containing one or more serving cells with the same or different uplink group identifiers served by the second base station. The UE performs uplink alignment, monitoring and management procedures linking to the first or the second cell group identifier. In one embodiment, the UE associates a first MAC entity with the first cell group identifier, and a second MAC entity with the second cell group identifier.

In a second novel aspect, a group TAG is configured for the UE. The group TAG is a super set of the cell TAGs of the UE. The group TAG contains one or more cell TAGs that are associated with serving cells served by the same base station or the same set of co-located antennas. In one embodiment of the current invention, the UE determines whether the group TAG is uplink synchronized based on detected conditions of the TATs associated with the cell TAG in the group TAG. In another embodiment of the current invention, upon determining the group TAG is no longer uplink synchronized, the UE stops all TATs that is associated with the group TAG. In this situation, the UE keeps the other TATs associated with another group TAG running.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 5 is an exemplary flow diagram where a UE 501 determines a cell group identifier for a serving cell based on explicitly command from the network.

FIG. 6 is an exemplary flow diagram where a UE 601 determines a cell group identifier for a serving cell based on a preconfigured or configurable database.

FIG. 7 is an exemplary flow diagram where a UE 701 determines a cell group identifier for a serving cell based on parameters in the messages received from the network.

DETAILED DESCRIPTION

Reference will now be made in detail to some embodiments of the invention, examples of which are illustrated in the accompanying drawings.

Figure 1:
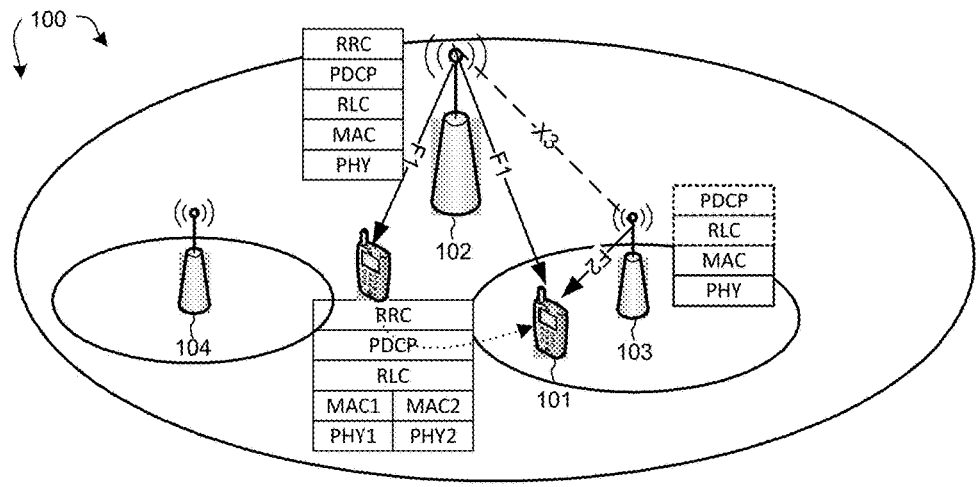
FIG. 1 illustrates a system diagram of a small cell network with inter-eNB carrier aggregation in accordance with one novel aspect.

FIG. 1 illustrates a system diagram of a small cell network 100 with inter-eNB carrier aggregation in accordance with one novel aspect. Small cell network 100 comprises a main base station eNB, also referred as an anchor eNB 102, two drift eNBs 103 and 104 and a UE 101. Small cell network 100 supports multiple component carriers over different frequency channels, and carrier aggregation for serving cells originated from different eNBs. For uplink (UL) synchronization between a UE and its base station with respect to each component carrier (CC), the UE receives an UL timing advance from the eNB, which compensates for the propagation delay between the eNB and the UE. For multiple configured CCs, some CCs may share the same timing advance with some offset tolerance, while other CCs must have their own timing advance when the offset becomes non-negligible. As a result, multiple timing advance groups are required such that different timing advance values are applied to different CCs to avoid inter-symbol interference. One timing advance group (TAG) refers to a group of DL/UL CCs having the same or similar UL timing advance value. The UE could derive DL timing from any of the DL CCs, and use the same UL timing (e.g., by adding the timing advance value to the DL timing) for all the UL transmission.

Initially, UE 101 camps on the macro cell served by eNB 102. UE 101 establishes Radio Resource Control (RRC) connection with the Radio Access Network (RAN). eNB 102 provides and controls the initial RRC connection and provides NAS mobility information and security input. eNB 102 is the anchor eNB for UE 101. In a small cell network configuration, UE 101 moves within the coverage area of anchor eNB 102 while moving into the coverage area of eNB 103. Upon entering eNB 103 coverage area, UE 101 can offload some traffic to eNB 103 if needed. In such situation, inter-eNB carrier aggregation can be configured for UE 101. UE 101 can use additional resources from eNB 103, which is a drift eNB in the small cell network system. The coordination between anchor eNB 102 and drift eNB 103 can be performed through Xn interface, for example, X3 or X2 interface. The Xn interfaces, also known as backhaul connections provide communication and coordination between eNBs. However, heavy reliance on such interface introduces undesirable delays for the system.

FIG. 1 also includes simplified block diagrams of protocol stacks in small cell network 100 for anchor eNB 102, drift eNB 103 and UE 101. At network side, the protocol stack in anchor eNB 102 includes PHY, MAC, RLC, PDCP, RRC, and a scheduler. Because drift eNB 103 has its own independent scheduler, the protocol stack in eNB 103 includes at least PHY, MAC, and a scheduler, and possible RLC and PDCP too. At UE side, for UEs equipped with multiple PHY and MAC modules, they can be configured based on its usage for carrier aggregation and small cell operation. In one novel aspect of the current invention, UE 101 has multiple MAC layer associated with corresponding PHY layer. In one embodiment, UE 101 is equipped with MAC1 and established RRC connection with anchor eNB 102. As UE 101 moves into the coverage area of eNB 103, the network may decide to aggregation resources from eNB 103 to offload traffics from UE 101. Inter-eNB carrier aggregation will be configured for UE 101. UE 101 upon detecting inter-eNB carrier aggregation being configured, would activate one MAC entity, MAC2, and initialize the corresponding PHY sub-layer, which is PHY2.

When UE 101 establishes RRC connection with anchor eNB 102, the corresponding PHY sub-layer (PHY1) is initialized and one MAC entity (MAC1), and/or RLC entities and PDCP entities should be established in the UE side, responsible for data transmission and reception through anchor eNB 102. As UE 101 moves into coverage area of eNB 103 and detects an inter-eNB carrier aggregation is configure, the corresponding PHY sub-layer (PHY2) is initialized and new MAC entity (MAC2), and/or RLC entities and PDCP entities should be established in the UE side, responsible for data transmission and reception through drift eNB 103. The new MAC entity MAC2 should be enabled or to be set up corresponding to the new serving cells from drift eNB 103. If a MAC entity is implemented by hardware, the functions of this MAC entity should be enabled and configured. If a MAC entity is implemented by software, the functions of this MAC entity should be added or configured.

Figure 2:
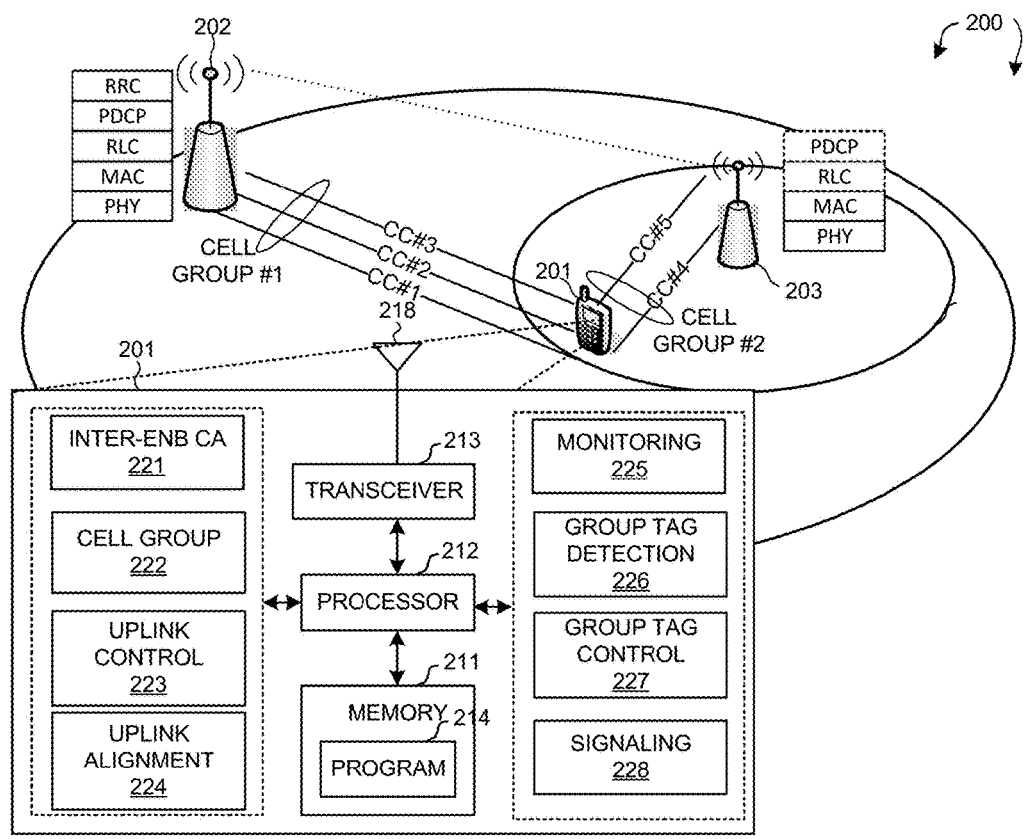
FIG. 2 is a schematic diagram of a network that supports inter-eNB carrier aggregation with different cell groups configured for a UE in accordance with embodiments of the current invention.

FIG. 2 is a schematic diagram of a network 200 that supports inter-eNB carrier aggregation with different cell groups configured for a UE 201 in accordance with embodiments of the current invention. UE 201 establishes RRC connection with anchor eNB 202. Network 200 supports inter-eNB carrier aggregation. UE 201 is configured with inter-eNB carrier aggregation. When UE 201 moves into the coverage area of eNB 203, UE 201 can be configured with inter-eNB carrier aggregation. UE 201 can offload traffic from eNB 202 to eNB 203. UE 201 can be configured with multiple serving cells originated from two different eNBs, for example eNB 202 and eNB 203. Component carrier (CC) #1 is configured for UE 201 and is originated from anchor eNB 202. Similarly, CC #2 and CC #3 are both originated from eNB 202. CC #4 and CC #5 are configured for UE 201 and are originated from drift eNB 203. The five configured CCs all serve UE 201. Such configuration gives UE 201 larger bandwidth and more flexibility in aggregating resource but it poses a set of uplink alignment, monitoring and management issues. For example, it is impossible for one eNB, eNB 202 or 203, to monitor the uplink synchronization of another eNB through the traditional uplink signal measurement. There is no benefit for one eNB to maintain the uplink synchronization of another through TAC forwarded from the Xn interfaces.

In one novel aspect of the current invention, as shown in FIG. 2, cell groups are configured to optimize the uplink alignment, monitoring and management procedures. CC #1, CC #2 and CC #3, all originated from the same eNB 202 are configured to be in the same cell group of Cell Group #1. Similarly, CC #4 and CC #3, all originated from the same eNB 203 are configured to be in the same cell group of Cell Group #2. Each serving cell or component carrier (CC) is further configured with a cell group identifier that corresponds to the same originating base station or the same set of antennas. The cell group identifier enables the base stations and/or the network to better control uplink procedures such as uplink alignment, monitoring and management procedures.

FIG. 2 also includes a simplified block diagram of UE 201 in accordance with novel aspects of the current invention. UE 201 comprises memory 211, a processor 212, a transceiver 213 coupled to an antenna 218. UE 201 also comprises various function modules including an inter-eNB carrier aggregation module 221, a cell group module 222, an uplink control module 223, an uplink alignment module 224, a monitoring module 225, a group TAG detection module 226, a group TAG control module 227, and a signaling module 228.

Inter-eNB carrier aggregation module 221 detects an inter-eNB CA and configures serving cells with uplink group identifiers, wherein the serving cells are served by a first or a second base station in a wireless network. Cell group module 222 determines which cell group a serving cell belongs to according to different methods. Uplink control module 223 performs uplink alignment, monitoring and management procedures linking to cell group identifiers. Uplink alignment module 224 obtains initial uplink time alignment through random access procedure. Monitoring module 225 monitors timing advance commands (TAC) associated with cell TAGs. Group TAG detection module 226 determines if the group TAG is uplink synchronized based on conditions. Group TAG control module 227 stops all serving cells associated with a group TAG except for a primary serving cell or the serving cells with PUCCH when the group TAG is not uplink synchronized. Signaling module 228 notifies the first base station the failure of the second base station when the group TAG associated with the second base station is no long uplink synchronized. The different modules are function modules that can be implemented by software, firmware, hardware, or any combination thereof. The function modules, when executed by the processors (e.g., via executing program codes 214), allow UE 201 to manage multiple cell groups, uplink groups, TAG, TAT and other uplink alignment, monitoring and management procedures.

When inter-eNB carrier aggregation is configured, it is beneficial to configure cell group identifier such that serving cells that are originated from the same base station or the same set of antennas are labeled with the same cell group identifier. Each serving cell in a timing advance group (TAG) is introduced to identify a group of serving cells to apply the same policy for uplink alignment procedures. In one novel aspect of the current invention, for inter-eNB carrier aggregation system a second tier of identifier, which is a cell group identifier, is configured such that the serving cells with the same cell group identifier, can be identified to follow the same or similar policy for certain uplink alignment, monitoring, management or other uplink procedures. For example, with the new cell group identifier, the procedures of uplink alignment, monitoring and management can be optimized based the cell group identifier. Using a two-tier identifier for uplink alignment is an example of such improvement.

Figure 3:
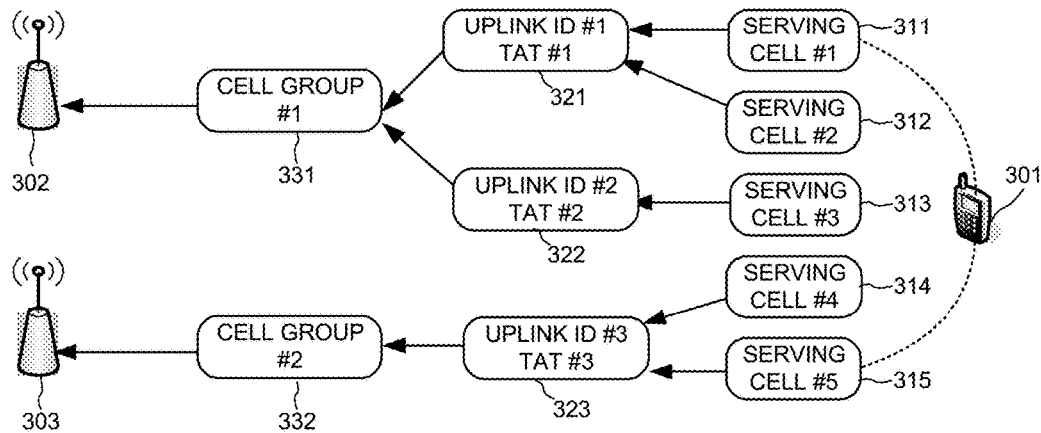
FIG. 3 is an exemplary diagram of a cell group configuration with multiple TAGs when an inter-eNB carrier aggregation is configured.

FIG. 3 is an exemplary diagram of a cell group configuration with multiple TAGs when an inter-eNB carrier aggregation is configured. A UE 301 is connected with an eNB 302 and an eNB 303. When inter-eNB carrier aggregation is configured, the downlink transmission timing between different eNBs or different sets of co-located antennas cannot be exactly synchronized. At the same time, the propagation delay and path loss between different serving cells originated from different base stations or different co-located sets of antennas can be quite different. Such difference will result in significant differences in the uplink transmission timing. It is advantageous to make each eNB to perform measurements on the corresponding uplink transmissions and to determine the corresponding time advancing (TA) values independent of each other. The current TAG concept considers intra-eNB carrier aggregation. Different serving cells from the same eNB can be configured with different TAG. Each TAG will have its own TAT. Improvements are needed for inter-eNB carrier aggregation.

As shown in FIG. 3, inter-eNB carrier aggregation is configured for UE 301. UE 301 is configured with five serving cells: 311 a serving cell #1, 312 a serving cell #2, 313 a serving cell #3, 314 a serving cell #4, and 315 a serving cell #5. In one embodiment of the current invention, 311 serving cell #1 and 312 serving cell #2 are configured with the same uplink ID, which is 321 Uplink ID #1 with TAT #1. Uplink ID #1 can be the same as the current TAG defined for carrier aggregation. Similarly, 313 serving #3 is configured with 322 Uplink ID #2 with TAT #2. 314 serving cell #4 and 315 serving cell #5 are configured with the same uplink ID, which is 323 Uplink ID #3, with TAT #3. Such configuration does not give the system the identifier of a base station or a set of co-located antennas from which a serving cell is originated. In one embodiment of the current invention, a second tier identifiers are configured. 331 Cell Group #1 is configured to include 321 Uplink ID #1 and 322 Uplink ID #2. 332 Cell Group #2 is configured to include 323 Uplink ID #3. 331 Cell Group #1 belongs to eNB 302. 332 Cell Group #2 belongs to eNB 303. The illustrated two-tier identifier enables the UE and/or the system to perform uplink alignment, monitoring and management procedures more efficiently when linking the cell group identifier to these procedures.

In one novel aspect of the current invention, the UE detects the condition of an inter-eNB carrier aggregation being configured and performs configuration and MAC activation to enable cell group configuration as described above.

Figure 4:
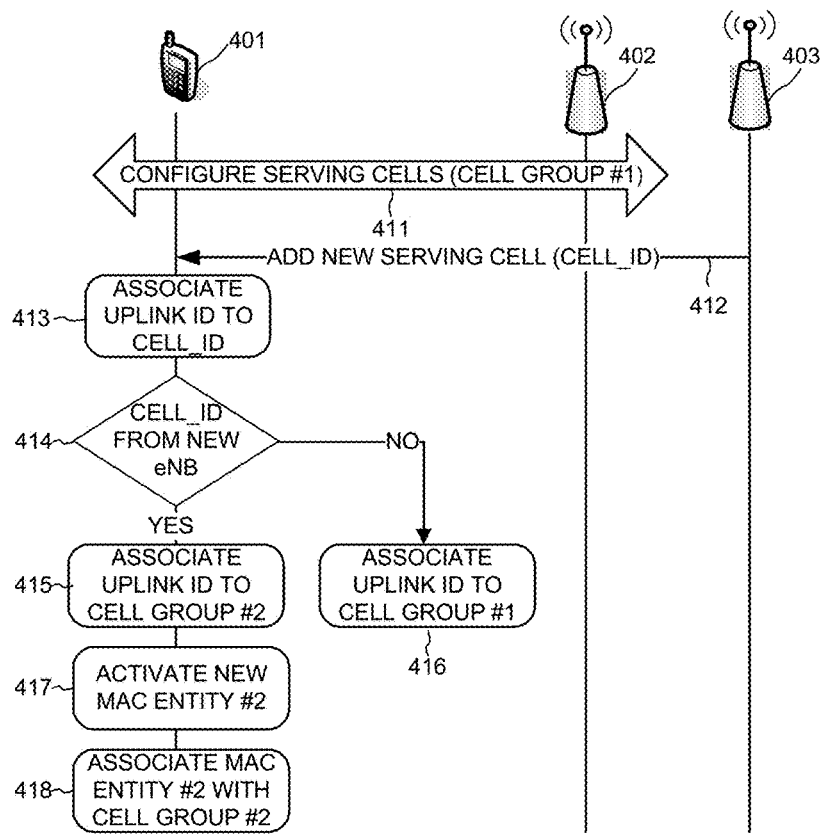
FIG. 4 is an exemplary flow diagram of a UE 401 performs an association procedure when detecting inter-eNB carrier aggregation being configured in accordance with embodiments of the current invention.

FIG. 4 is an exemplary flow diagram of a UE 401 performs an association procedure when detecting inter-eNB carrier aggregation being configured in accordance with embodiments of the current invention. UE 401 established RRC connection with an eNB 402. UE 401, at step 411, is configured with one or more serving cells originated from eNB 402. In one embodiment of the current invention, when UE 401 is capable of inter-eNB carrier aggregation, UE 401 configures these serving cells to cell group #1. In another embodiment of the current invention, when there is no inter-eNB carrier aggregation detected, UE 401 would not configure the cell group yet. At Step 412, UE 402 receives command from an eNB 403 to add new serving cell, with a CELL ID. In another embodiment of the current invention, this add new serving cell command can also come from eNB 402 indicating a serving cell from eNB 403 is to be added. The new serving cell with CELL_ID to be added is originated from a different eNB. At Step 413, UE 401 associates an uplink group identifier with the CELL_ID. The uplink group identifier is a cell TAG identifier in one embodiment of the current invention. At step 414, UE 401 determines whether the serving cell is from a new eNB or it is from the same eNB. The determination is based on the originating base station information. The origination base information can be explicitly included in the command coming from the network, or it can be derived locally by UE 401. If at Step 414, UE 401 determines that the serving cell is not originated from a new eNB, UE 401 moves to Step 416. At Step 416, UE 401 associates the assigned uplink group identifier to the existing cell group #1. If at Step 411, UE 401 does not configure a cell group identifier, UE 401 will skip Step 416. If at Step 414, UE 401 determines that the new serving cell with CELL_ID is originated from a new eNB, UE 401 moves to Step 415. At Step 415, UE 401 associates the uplink group identifier of the new serving cell to cell group identifier #2. If at Step 411, cell group is not configured, at Step 415, UE 401 configures cell group #1 and cell group #2 and associates corresponding uplink group identifiers to them.

In one novel aspect of the current invention, UE 401 upon detecting inter-eNB carrier aggregation being configured, UE 401, at Step 417, activates a new MAC entity #2 and its corresponding sub-layer PHY. At Step 418, UE 401 associates MAC entity #2 with cell group #2.

It is advantageous to configure two-tier identifiers in an inter-eNB carrier aggregation system. Each serving cell is configured with an uplink group identifier. These uplink group identifiers are grouped and associated with cell group identifiers based on the originating base stations or co-located sets of antennas. Each cell group identifier includes one or more uplink group identifiers that are associated with the same base station or the same set of co-located antennas. Therefore, upon detecting inter-eNB carrier aggregation being configured, the UE needs to determine a cell group identifier for each serving cell. There are different ways to determine the cell group identifiers. In one embodiment of the current invention, cell group identifiers are explicitly included in the network command. In another embodiment of the current invention, the UE retrieves the cell group identifier from a configurable or preconfigured database. In another embodiment of the current invention, the UE derives the cell group identifier from the command received from the network. FIG. 5 to FIG. 7 illustrate these methods. In one embodiment of the current invention, the UE use a combination of any of the available method to determine a cell group identifier.

FIG. 5 is an exemplary flow diagram where a UE 501 determines a cell group identifier for a serving cell based on explicitly command from the network. UE 501 is configured with inter-eNB carrier aggregation. UE 501 is connected with an eNB 502 and an eNB 503. At Step 511, UE 501 receives a command from the network, such as eNB 503, to add a new serving cell. In one embodiment of the current invention, as shown in FIG. 5, the command from the network includes a CELL_ID for the serving cell. The command from the network also explicitly includes a cell group identifier in the message. In another embodiment of the current invention, the cell group identifier can be embedded in a separate message other than the add-new-serving-cell command message. Upon receiving the network command, UE 501, at Step 512, associates an uplink group identifier with the CELL_ID. At Step 513, UE 501 associates the uplink group identifier with the cell group identifier explicitly included in the command message.

FIG. 6 is an exemplary flow diagram where a UE 601 determines a cell group identifier for a serving cell based on a preconfigured or configurable database. UE 601 is configured with inter-eNB carrier aggregation. UE 601 is connected with an eNB 602 and an eNB 603. At Step 611, UE 601 receives a command from the network, such as eNB 603, to add a new serving cell. This network command includes a CELL_ID. Upon receiving this command, UE 601, at Step 612, associates an uplink group identifier with the CELL_ID. UE 601 detects that there is no explicit cell group identifier in the network command. UE 601, at Step 613, retrieves a cell group identifier based on the CELL_ID from a cell-group-identifier database 604. Cell-group-identifier database 604 can be hard coded inside UE 601. Cell-group-identifier database 604 can also be pre-configured by UE 601. In another embodiment of the current invention, cell-group-identifier database 604 can be preconfigured and dynamically updated. At Step 614, UE 601 associates the uplink group identifier with the retrieved cell group identifier.

FIG. 7 is an exemplary flow diagram where a UE 701 determines a cell group identifier for a serving cell based on parameters in the messages received from the network. UE 701 is configured with inter-eNB carrier aggregation. UE 701 is connected with an eNB 702 and an eNB 703. At Step 711, UE 701 receives a command from the network, such as eNB 703, to add a new serving cell. Upon receiving this command, UE 701, at Step 712, associates an uplink group identifier with the CELL_ID. UE 701 detects that there is no explicit cell group identifier in the network command. UE 701, at Step 713, resolves an E-UTRAN Cell Global Identifier (ECGI) of serving cell for eNB ID acquisition based on the received command from the network. UE 701, at Step 714, upon resolving the eNB ID that serves the serving cell, associates the corresponding cell group identifier with the uplink group identifier.

The two-tier identifier configured for uplink alignment, monitoring and management procedures enables the system to manage UE resources effectively. The cell group identifier is a super of the uplink group identifiers that associate with serving cells originated from the same base station or the same set of co-located antennas. Such architecture enables the system to apply the same policy to the group of the serving cells. One example is to handle the time advancing group. Under this architecture, each serving cell is associated with a TAG in the traditional way. The TAG identifier for the serving cells is a type 1 TAG or a cell TAG, which is served as the uplink group identifier. A type 2 TAG, or a group TAG, is introduced to better the time alignment procedures for inter-eNB carrier aggregation. The type 2 (or group) TAG corresponds to the cell group identifier. The type 2 TAG, which is associated with a cell group identifier for timing advance features, includes one or more type 1 TAG that are associated with the same base station or the same set of co-located antennas. With this two-tier identifier structure, uplink alignment procedure can be handled on the top level based on Type 2 TAG, which is associated with the cell group identifier in accordance with the current invention.

Figure 8:
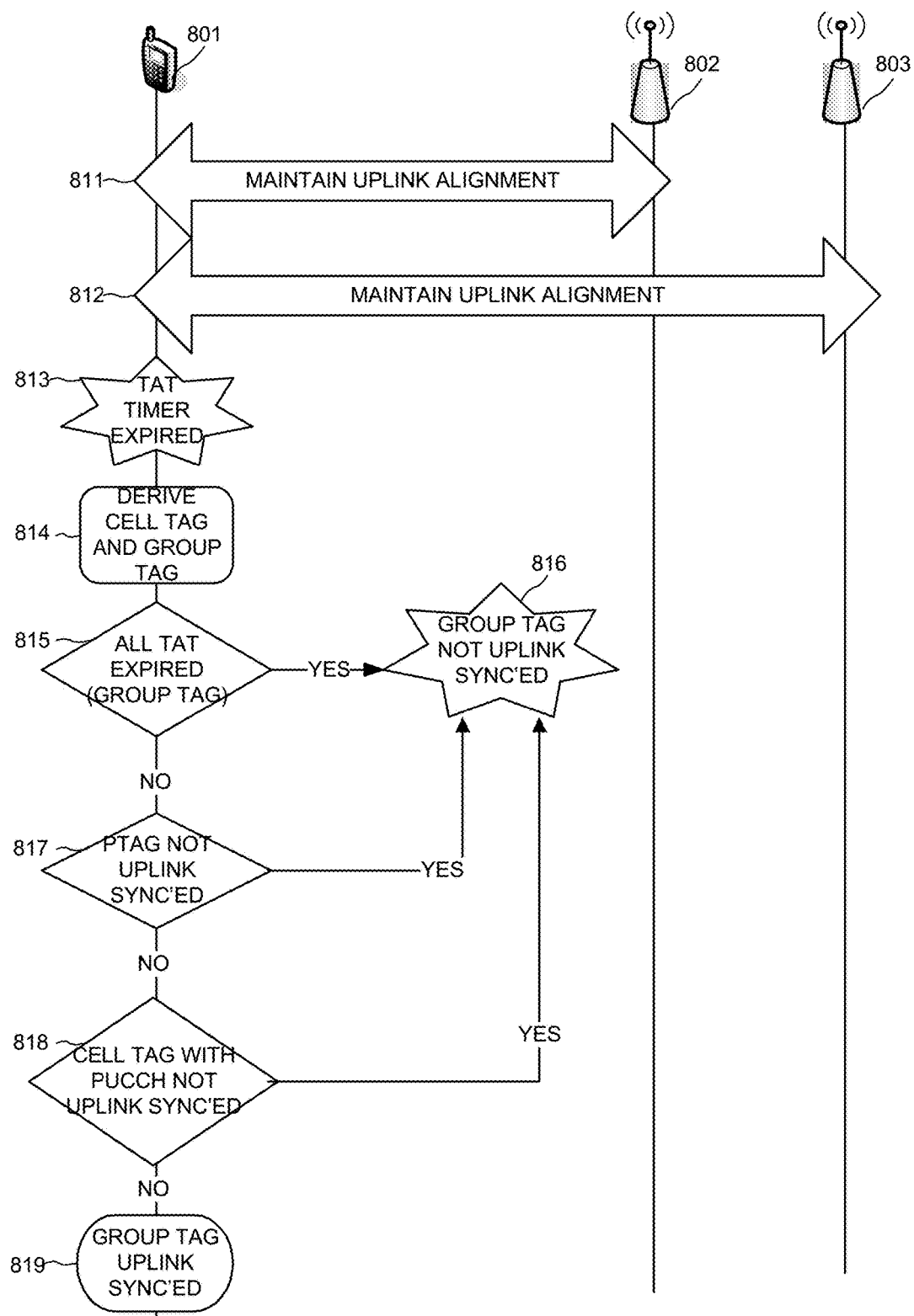
FIG. 8 illustrates an exemplary flow chart for an uplink-synchronization detection procedure based on two-tier identifiers for serving cells in accordance with embodiments of the current invention.

FIG. 8 illustrates an exemplary flow chart for an uplink-synchronization detection procedure based on two-tier identifiers for serving cells in accordance with embodiments of the current invention. UE 801 is configured with inter-eNB carrier aggregation. UE 801 is connected with an eNB 802 and an eNB 803. UE 801 configures one or more TAG group, which is associated with the uplink group identifier for its serving cells. Each serving cell is associated with one uplink group identifier. The uplink group identifier may include one or more serving cells. UE 801 also configures two cell group identifiers. The first cell group identifier is associated with eNB 802. The second cell group identifier is associated with eNB 803. The first cell group identifier is a super set of one or more uplink group identifiers that is associated with serving cells served by eNB 802. The second cell group identifier is a super set of one or more uplink group identifiers that is associated with serving cells served by eNB 803.

UE 801 maintains up link alignment with eNB 802 at Step 811. At Step 812, UE 801 maintains up link alignment with eNB 803. At Step 813, UE 801 detects a TAT timer expired. At Step 814, UE 801 derives the cell TAG and the group TAG associated with the expired TAT. At Step 815, UE 801 determines if all TATs in the group TAG are expired. If UE 801 determines that all TATs in the group TAG are expired, UE 801 moves to Step 816. At Step 816, UE 801 determines that the group TAG is not uplink synchronized. If at Step 815 UE 801 determines that not all TATs associated with the group TAG are expired, UE 801 moves to Step 817. At Step 817, UE 801 further determines whether the primary TAG (pTAG) associated with the group TAG is uplink synchronized. If UE 801, at Step 817, determines that the pTAG associated with the group TAG is not uplink synchronized, UE 801 moves to Step 816, where UE 801 determines that the group TAG is not uplink synchronized. If at Step 817 UE 801 determines that the pTAG associated with the group TAG is uplink synchronized, UE 801 moves to Step 818. At Step 818, UE 801 determines whether the cell TAG associated with the PUCCH is uplink synchronized. If UE 801 determines, at Step 818, that the cell TAG associated with the PUCCH is not uplink synchronized, UE 801 moves to Step 816, where UE 801 determines that the group TAG is not uplink synchronized. If UE 801 determines, at Step 818, that the cell TAG associated with the PUCCH is uplink synchronized, UE 801 moves to Step 818. At Step 818, UE 801 determines that the group TAG is uplink synchronized.

Figure 9:
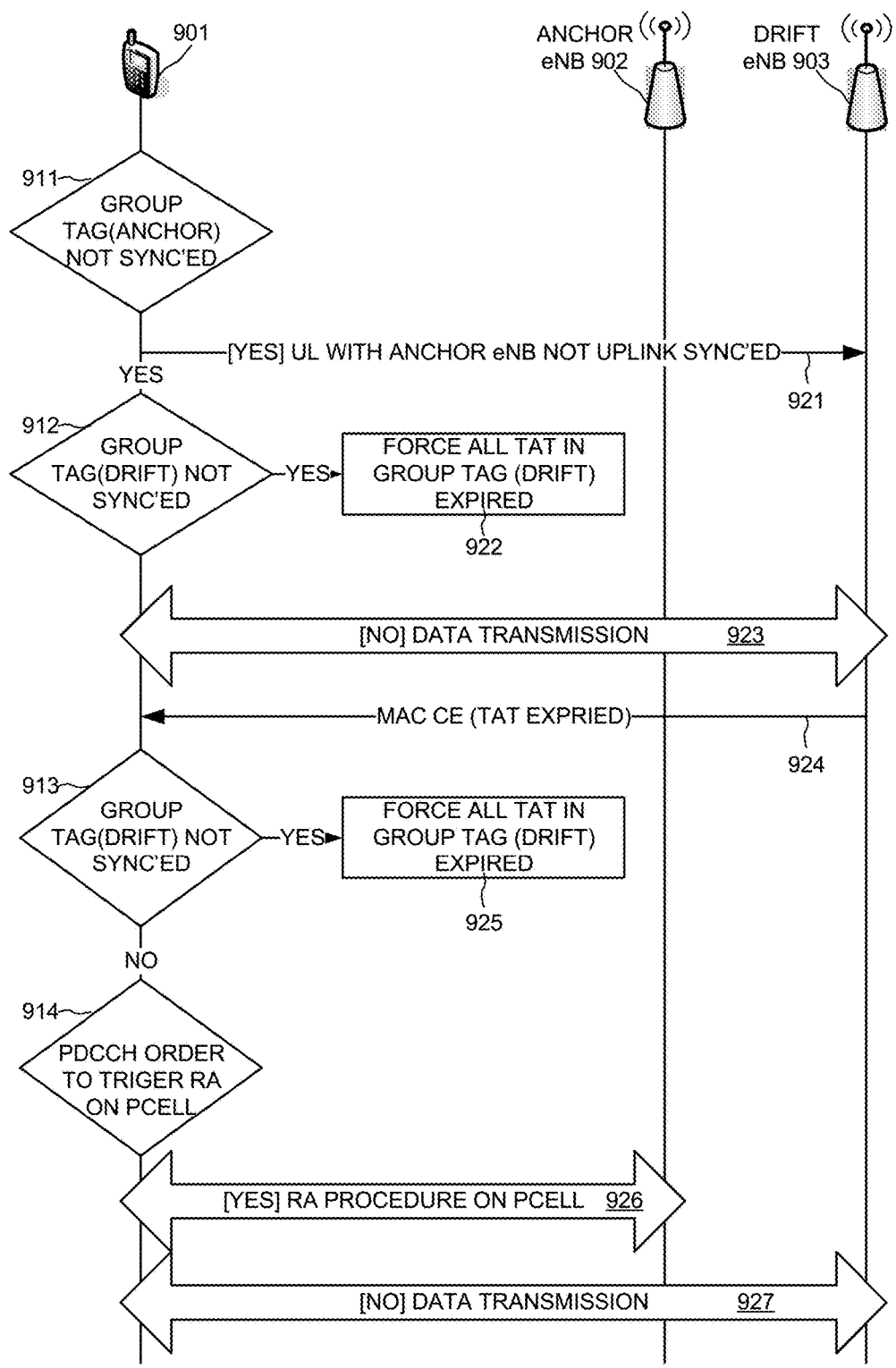
FIG. 9 illustrates an exemplary flow chart for an uplink-synchronization control procedure based on two-tier identifiers for serving cells in accordance with embodiments of the current invention.

FIG. 9 illustrates an exemplary flow chart for an uplink-synchronize control procedure based on two-tier identifiers for serving cells in accordance with embodiments of the current invention. UE 901 is configured with inter-eNB carrier aggregation in a small cell network. UE 901 is connected with an anchor eNB 902 and a drift eNB 903. UE 901 configures one or more TAG group, which is an uplink group identifier for its serving cells. Each serving cell is associated with one uplink group identifier. The uplink group identifier may include one or more serving cells. UE 901 also configures two cell group identifiers. The anchor group TAG is associated with anchor eNB 902. The drift group TAG is associated with drift eNB 903. The anchor group TAG is a super set of one or more uplink group identifiers that is associated with serving cells served by anchor eNB 902. The drift group TAG is a super set of one or more uplink group identifiers that is associated with serving cells served by eNB 903.

UE 901, configured with inter-eNB CA, determines if the anchor group TAG is synchronized at Step 911. In one embodiment of the current invention, UE 901 determines whether a group TAG is uplink synchronized by using the methods as shown in FIG. 8. If UE 901, at Step 911, determines that anchor group TAG is out of synchronization, UE 901 moves to Step 921. At Step 921, UE 901 attempts to inform drift eNB 903 that anchor eNB 902 is no longer uplink synchronized. UE 901 then moves to Step 912, where UE 901 determines if the drift group TAG is uplink synchronized. If UE 901 at Step 912 determines that the drift group TAG is not uplink synchronized, UE 901 moves to Step 922. At Step 922, UE 901 forces all TAT associated with drift group TAG to expire. If UE 901, at Step 912, determines that the drift group TAG is uplink synchronized, UE 901 moves to Step 923. At Step 923, UE 901 can redirect data traffic of UE 901 to drift eNB 903. With this architecture, UE 901 can take advantages of inter-eNB CA more efficiently.

After redirecting data transmission to drift eNB 903, UE 901 keeps on monitoring uplink synchronization status of eNB 903. At Step 923, UE 901 receives a message from eNB 903 indicating a TAT expired. The message can be included in a MAC CE or through other signaling means. Upon receiving this message, UE 901 moves to Step 913. At Step 913, UE 901 determines if the drift group TAG is uplink synchronized. If UE 901, at Step 913, determines that the drift group TAG is no longer uplink synchronized, it moves to Step 925. At Step 925, UE 901 forces all TAT associated with drift group TAG to expire. If UE 901, at Step 913, determines that the drift group TAG is uplink synchronized, UE 901 moves to Step 914. At Step 914, UE 901 keeps on monitoring the signals from PDCCH. If At Step 914, UE 901 determines that a trigger to perform a random access (RA) on the primary cell from anchor eNB 902 is received from the PDCCH, UE 901 moves to Step 926, where UE 901 starts RA procedure on the primary cell. If at Step 914 UE 901 determines that there is no RA trigger received, UE 901 moves to Step 927, where UE 901 continues data transmission to drift eNB 903.

Figure 10:
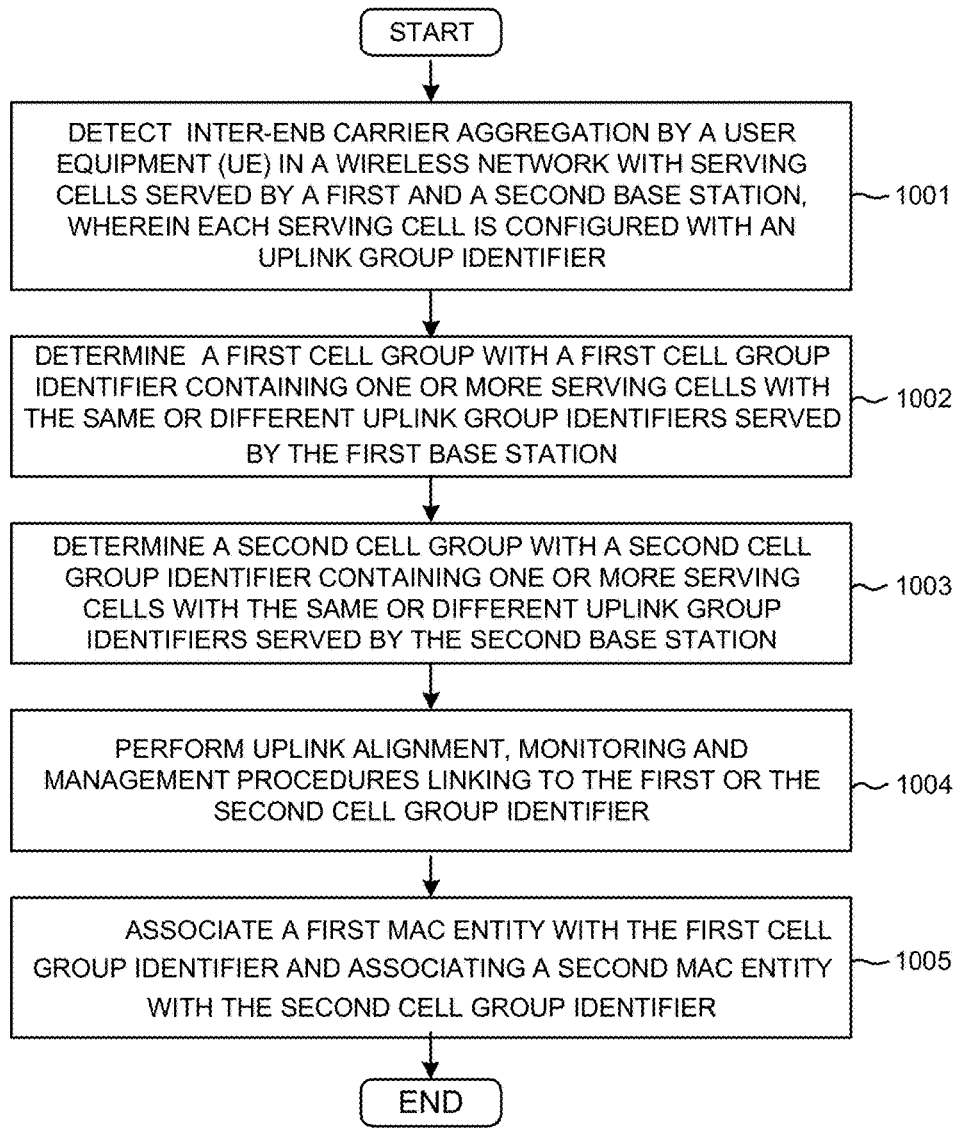
FIG. 10 is a flow chart of a method to configure different cell group identifiers for serving cells originated from different base stations and to perform uplink procedures based on the configured cell group identifiers.

FIG. 10 is a flow chart of a method to configure different cell group identifiers for serving cells originated from different base stations and to perform uplink procedures based on the configured cell group identifiers. At Step 1001, the UE detects an inter-eNB carrier aggregation in a wireless network with serving cells served by a first and a second base station, wherein each serving cell is configured with an uplink group identifier. At Step 1002, the UE determines a first cell group with a first cell group identifier containing one or more serving cells with the same or different uplink group identifiers served by the first base station. At Step 1003, the UE determines a second cell group with a second cell group identifier containing one or more serving cells with the same or different uplink group identifiers served by the second base station. At Step 1004, the UE performs uplink alignment, monitoring and management procedures linking to the first or the second cell group identifier. At Step 1005, the UE associates a first MAC entity with the first cell group identifier and a second MAC entity with the second cell group identifier.

Signaling Support

Inter-eNB CA can be configured to the UE through RRC message for serving cell addition/modification/removal. When the serving cells originating from and controlled by another eNB are configured to a UE, besides the IEs for cell identification which includes physical cell ID and downlink carrier frequency, additional IE is required to indicate that the serving cell is originating from and controlled by another eNB.

There are two methods for inter-eNB indication, i.e. explicitly and implicitly.

For explicit indication, if inter-eNB CA is supported with only two eNB involved, the IE can be a flag with the data type of Boolean. Otherwise, the IE for eNB index can be used, indicating from which eNB the corresponding serving cell is originating. Since serving cells originating from different eNBs will be associated with different Type 2 TAGs, the mapping relationship between the Type 1 TAG, Type 2 TAG and the corresponding eNB needs to be defined.

One example is illustrated in Table 1 and FIG. 3.

TABLE 1 the mapping relationship among the serving cell Index, Type 2 TAG ID and eNB Index

| ServCellIndex | SecTAG-Id | Type2TAG-Id | eNB Index |
|---|---|---|---|
| 0 | N/A | 0 | 0 |
| 1 | | 0 | |
| 2 | 1 | 0 | |
| 3 | 2 | 1 | 1 |
| 4 | 2 | 1 | |

FIG. 3 the mapping relationship among the serving cell Index, Type 1 TAG ID, Type 2 TAG ID and eNB Index. As shown in FIG. 3, Cell Group #1 and Cell Group #2 are Type 2 TAG IDs. Uplink ID #1, Uplink ID #2, and Uplink ID #3 are Type 1 TAG IDs. eNB 302 and eNB 301 each their own cell IDs.

For implicit indication, the TAG ID defined in Rel-11 can be reused and the mapping rule is defined in the specification. For example, pTAG and SecTAG-ID with value 1 is corresponding to the Type 2 TAG originating from the anchor eNB, while SecTAG-ID with value 2 or 3 is corresponding to the Type 2 TAG originating from the drift eNB. One example is illustrated in Table 2.

TABLE 2 the mapping relationship among the serving cell Index, TAG ID and eNB

| ServCellIndex | SecTAG-Id | Type2TAG-Id | eNB |
|---|---|---|---|
| 0 | N/A | 0 | Anchor eNB |
| 1 | | 0 | |
| 2 | 1 | 0 | |
| 3 | 2 | 1 | Drift eNB |
| 4 | 2 | 1 | |

Or the constraint of Maximum number of secondary TAGs i.e. maxSecTAG can be defined with a larger value, e.g. 7. If inter-eNB CA is supported with only two eNB involved, the presence of certain extended values can be used to indicate that the corresponding Type 1 TAG is originating from the drift eNB. For example, SecTAG-Id with the value from 4 to 7 is used for drift eNB.

TAC in RAR and TAC MAC CE

The random access procedure is performed to obtain or restore the uplink time alignment. The TAC is transmitted through random access response (RAR) message. After the initial time alignment is obtained, TAC MAC CE is used to adjust the uplink transmission timing based on the uplink measurement.

If the TAC is restricted to be transmitted by the eNB through the activated serving cells within its own Type 2 TAG, when a TAC sent by an eNB is received, UE applies it accordingly to the Type 2 TAG controlled by the eNB. For the case of TAC received in RAR message, the RAR message should be transmitted by the eNB through the activated serving cells within its own Type 2 TAG, but not limited to PCell. When a TAC is received in a RAR message for a serving cell belonging to a Type 2 TAG, which is originating from and controlled by a specific eNB, the current procedure specified in Rel-11 can be reused.

Figure 11:
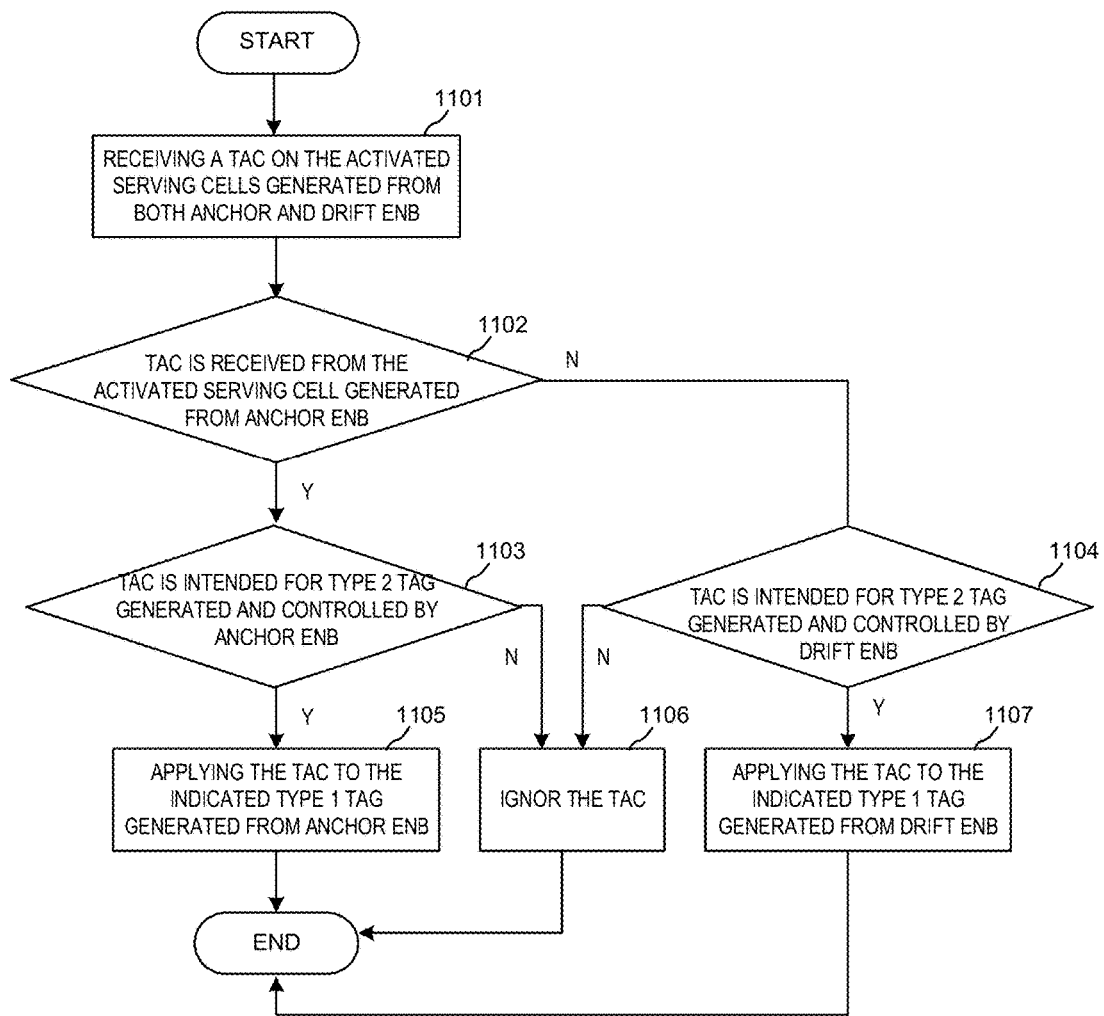
FIG. 11A illustrates an exemplary flow chart that the UE ignores the TAC when the received TAC with the TAG ID indicated that the corresponding Type 1 TAG is originating from another eNB.
FIG. 11B illustrates an exemplary flow chart that UE only applies the TAC if the associated TAT is not running upon receiving a TAC with TAG ID indicating the corresponding Type 1 TAG is originated from another eNB.
Figure 11:
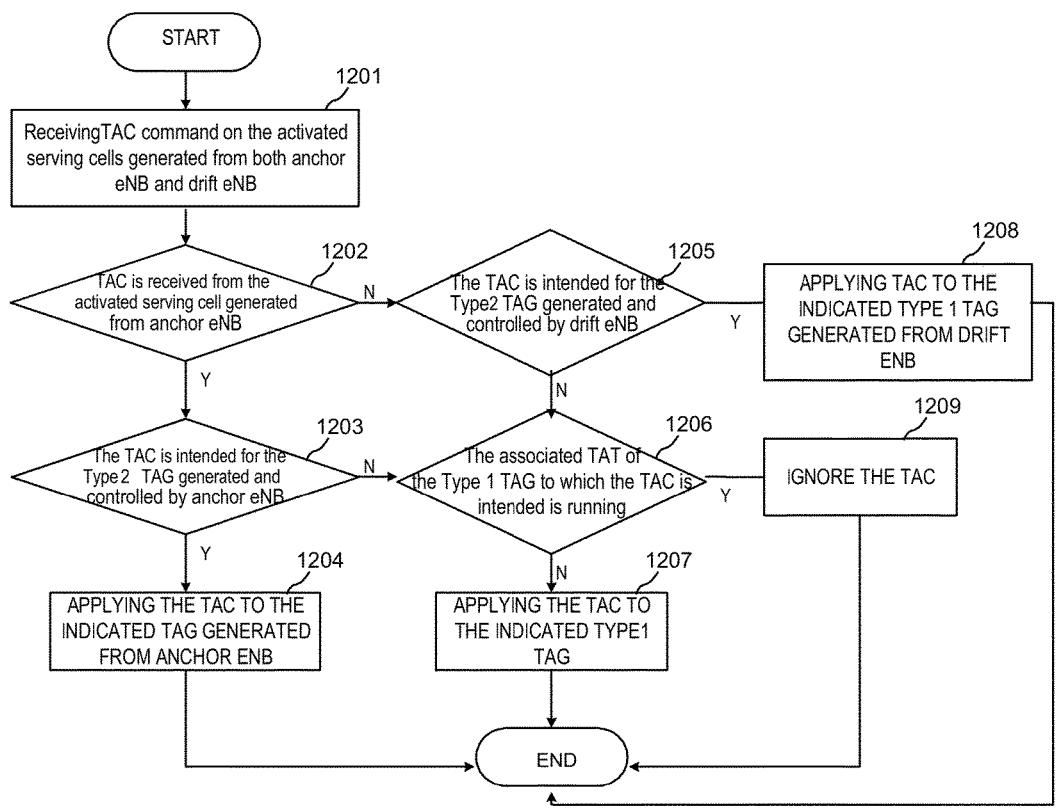

If a TAC MAC CE received with the TAG ID indicating that the corresponding Type 1 TAG is originating from another eNB, there are two alternatives to deal with the case. Since the mapping relationship between the Type 1 TAG, Type 2 TAG and the eNB is configured through dedicated signaling or hard-coded by the rule defined in the specification, UE knows clearly that whether the Type 1 TAG is controlled by the eNB or not. The first one is that UE can ignore the TAC, considering it's a network implementation error. One example is illustrated in FIG. 11A. After associating the serving Cell originating from the drift eNB with the corresponding MAC entity and Type 2 TAG, UE begins to receive TAC on the activated serving cells originating from the anchor eNB and the drift eNB. If one TAC is received from the activated serving cell originating from the anchor eNB, UE will check whether the TAC is intended for the Type 2 TAG originating from and controlled by the anchor eNB. If the TAC is intended for the Type 2 TAG originating from the anchor eNB, UE will apply the TAC to the indicated Type 1 TAG. Otherwise, UE ignores the TAC. If one TAC is received from the activated serving cell originating from the drift eNB, the same procedure applies.

FIG. 11A illustrates an exemplary flow chart that the UE ignores the TAC when the received TAC with the TAG ID indicated that the corresponding Type 1 TAG is originating from another eNB. At Step 1101, the UE receives a TAC on the activated serving cells generated from both anchor and drift eNBs. At Step 1102, the UE checks if the TAC is received from the activated serving cell generated from anchor eNB. If Step 1102 indicates no, the UE moves to Step 1104, where the UE further checks if the TAC is intended for Type 2 TAG generated and controlled by the drift eNB. If Step 1104 indicates no, the UE moves to Step 1106 and ignores the TAC. If Step 1104 indicates yes, the UE moves to Step 1107 and applies the TAC to the indicated Type 1 TAG generated from the drift eNB. If Step 1102 indicates yes, the UE moves to Step 1103 and further checks if the TAC is intended for type 2 TAG generated and controlled by the anchor eNB. If Step 1103 indicates no, the UE moves to Step 1106 and ignores the TAC. If Step 1103 indicates yes, the UE moves to Step 1105 and applies the TAC to the indicated type 1 TAG generated from the anchor eNB.

The second one is that UE only applies the TAC if the associated TAT is not running. So if the associated TAT is running, the UE can ignore the TAC; if the associated TAT is not running, the UE applies the TAC and starts the associated TAT. One example is illustrated in FIG. 11B. After associating the serving cell with the corresponding MAC entity and the Type 2 TAG originating from the drift eNB, UE begins to receive TAC on the activated serving cells originating from the anchor eNB and the drift eNB. If one TAC is received from the activated serving cell originating from the anchor eNB, UE will check whether the TAC is intended for the Type 2 TAG originating from and controlled by the anchor eNB. If the TAC is intended for the TAG originating by the anchor eNB, UE will apply the TAC to the indicated Type 1 TAG. Otherwise, UE will check whether the associated TAT of the Type 1 TAG originating from the drift eNB is running or not. If the associated TAT is running, UE ignores the TAC. Otherwise, UE applies the TAC to the indicated Type 1 TAG originating from the drift eNB. If one TAC is received from the activated serving cell originating from the drift eNB, the same procedure applies.

FIG. 11B illustrates an exemplary flow chart that UE only applies the TAC if the associated TAT is not running upon receiving a TAC with TAG ID indicating the corresponding Type 1 TAG is originated from another eNB. At Step 1201, the UE receives TAC on the activated serving cells generated from both the anchor eNB and the drift eNB. At Step 1202, the UE determines whether the TAC is received from the activated serving cell generated from the anchor eNB. If Step 1202 indicates no, the UE moves to Step 1205 and further checks if the TAC is intended for the Type 2 TAG generated and controlled by the drift eNB. If Step 1205 indicates yes, the UE moves to Step 1208 and applies TAC to the indicated Type 1 TAG generated from the drift eNB. If Step 1205 indicates no, the UE moves to Step 1206 and further checks if the associated TAT of the Type 1 TAG to which the TAC is intended is running. If Step 1206 indicates yes, the UE moves to Step 1209 and ignores the TAC. If Step 1206 indicates no, the UE, at Step 1207, applies the TAC to the indicated Type 1 TAG. If Step 1202 indicates yes, the UE, at Step 1203, further checks if the TAC is intended for the Type TAG generated and controlled by the anchor eNB. If Step 1203 indicates yes, the UE moves to Step 1204 and applies the TAC to the indicated TAG generated from the anchor eNB. If Step 1203 indicates no, the UE moves to Step 1206 and further checks if the associated TAT of the Type 1 TAG to which the TAC is intended is running. If Step 1206 indicates yes, the UE, at Step 1209, ignores the TAC. If Step 1206 indicates no, the UE at Step 1207 applies the TAC to the indicated Type 1 TAG.

If the TAC is not restricted to be transmitted by the eNB through the activated serving cells within its own Type 2 TAG, when a TAC sent by an eNB is, UE will deliver the TAC to the corresponding MAC entity. Then UE applies the TAC accordingly to the Type 1 TAG based on the indicated TAG ID.

Since the TAC is received by a MAC entity of the UE, UE first checks whether the TAC is intended for the Type 2 TAG associated with the MAC entity. If it is not the case, the MAC entity will send the TAC to the corresponding MAC entity.

Timing Reference and Path Loss Reference

For the Type 1 TAG originating from the drift eNB, any activated serving cell in the Type 1 TAG can be used as timing reference and SIB2-linked DL CC can be used as the path loss reference.

It is also possible that a specific serving cell can be configured to be used as the timing reference or path loss reference for each Type 1 TAG. The serving cell used as reference can be the one which is activated firstly, or the serving cell capable of PUCCH transmission and it can't be deactivated if there is any activated serving cell available in the Type 1 TAG. So the configured specific serving cell in the TAG can be used as the timing reference. Path loss reference will be configurable between SIB2 linked downlink CC or the specific serving cell.

Maintenance of Uplink Time Alignment

When inter-eNB CA is configured for the UE, an additional MAC entity is established for the drift eNB. So the uplink time alignment for each Type 2 TAG can be maintained by the corresponding MAC entity, which is different from intra-eNB CA, wherein there is only one MAC entity, which is responsible for the uplink time alignment of all the serving cells belonging to different Type 1 TAGs. Considering the drift eNB would have its own private PUCCH, even the serving cells originating from and controlled by the anchor eNB is out of synchronization, both downlink and uplink data transmission can be performed normally through the drift eNB if the Type 2 TAG is uplink time aligned.

After associating the serving cells originating from different eNBs to separate Type 2 TAGs and MAC entities and obtaining the initial uplink time alignment through random access procedure, UE begins to monitor the TAC MAC control element (CE) on the activated serving cells belonging to the Type 2 TAGs originating from both anchor eNB and drift eNB. When a TAC MAC CE is received, UE applies the TAC for the Type 1 TAG accordingly which belongs to the Type 2 TAG, and then the associated TAT is started or restarted. When Type 2 TAG specific TAT associated with one Type 2 TAG is not running or the Type 2 TAG is not UL time aligned, UE shall deactivate all the serving cells in the Type 2 TAG except the one on which system information and paging is received, e.g. PCell in the pTAG. UE shall flush all HARQ buffers for all serving cells belonging to the Type 2 TAG, notify RRC to release PUCCH/SRS for all serving cells belonging to the Type 2 TAG, clear any configured downlink assignments and uplink grants belonging to the Type 2 TAG and consider all running TATs associated with the Type 1 TAGs belonging to the Type 2 TAG as expired. Meanwhile, the TAT associated with the other Type 2 TAG keeps running as it is until it expires or is stopped. One example of the procedure described above is illustrated in FIG. 13.

Figure 13:
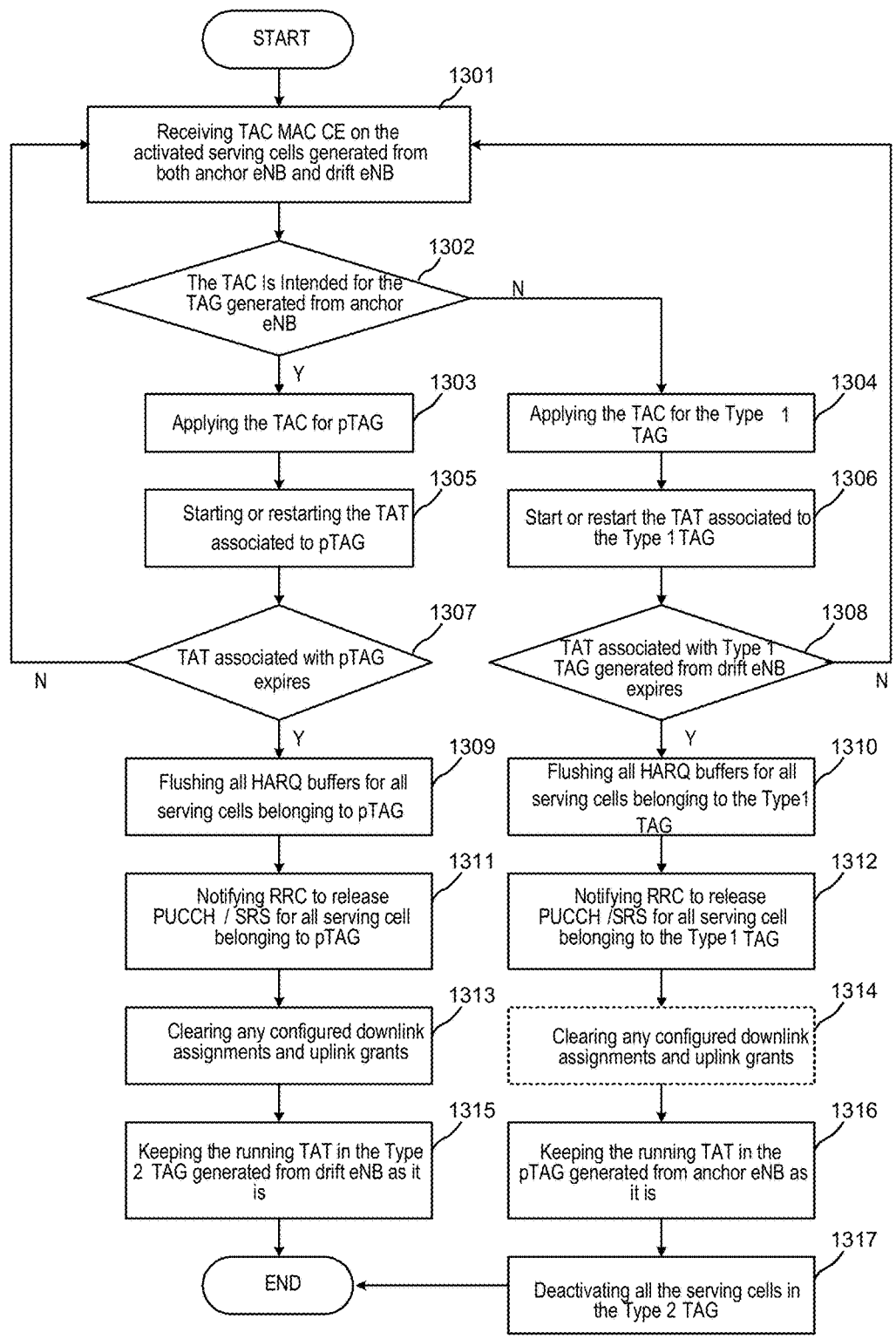
FIG. 13 is an exemplary flow chart of the maintenance of uplink time alignment through TAC MAC CE.

FIG. 13 is an exemplary flow chart of the maintenance of uplink time alignment through TAC MAC CE. At Step 1301, the UE receives TAC MAC CE on the activated serving cells generated from both the anchor eNB and the drift eNB. At Step 1302, the UE determines if the TAC is intended for the TAG generated from the anchor eNB. If Step 1302 indicates yes, the UE at Step 1303 applies TAC for the primary TAG (pTAG). UE moves to Step 1305 and starts or restarts the TAT associated to the pTAG. UE moves Step 1307 and checks if TAT associated with pTAG expires. If Step 1307 indicates no, the UE moves back to Step 1301. If Step 1307 indicates yes, the UE moves to Step 1309 and flushes all HARQ buffers for all serving cells belonging to pTAG. The UE moves to Step 1311 and notifies RRC to release PUCCH/SRS for all serving cells belonging to pTAG. The UE moves to Step 1313 and clears any configured downlink assignments and uplink grants. At Step 1315, the UE keeps the running TAT in the Type 2 TAG generated from the drift eNB as it is. If Step 1302 indicates no, the UE moves to Step 1304 and applies the TAC for the type 1 TAG. The UE continues to Step 1306 and starts or restarts the TAT associated to the Type 1 TAG. The UE moves to Step 1308 and checks if the TAT associated with Type 1 TAG generated from the drift eNB expires. If Step 1308 indicates no, the UE goes back to Step 1301. If Step 1308 indicates yes, the UE moves to Step 1310 and flushes all HARQ buffers for all serving cells belonging to the Type 1 TAG. The UE continues to Step 1312 and notifies RRC to release PUCCH/SRS for all serving cell belonging to the Type 1 TAG. The UE continues to Step 1314 and clears any configured downlink assignments and uplink grants. The UE moves to Step 1315 and keeps the running TAT in the pTAG generated from anchor eNB as it is. At Step 1317, the UE deactivate all the serving cells in the Type 2 TAG.

Assuming, the Type 2 TAG originating from the anchor eNB contains only one Type 1 TAG, i.e. pTAG, if the TAC is received for the pTAG originating from the anchor eNB, UE will apply the TAC for the pTAG. It starts or restarts the TAT associated with the pTAG. If TAT associated with pTAG expires, UE will flush all HARQ buffers for all serving cells belonging to pTAG, notify RRC to release PUCCH/SRS for all serving cells belonging to pTAG, clearing any configured downlink assignments and uplink grants belonging to the Type 2 TAG, and keep the running TAT associated with the Type 2 TAG originating from the drift eNB as it is.

Assuming the Type 2 TAG originating from the drift eNB contains only one Type 1 TAG, if the TAC is received for the Type 2 TAG originating from the drift eNB, UE will apply the TAC for the Type 1 TAG. It starts or restarts the TAT associated with the Type 1 TAG. If TAT associated with the Type 1TAG expires, i.e. the Type 2 TAG is not UL time aligned, UE will flush all HARQ buffers for all serving cells belonging to the Type 2 TAG, notify RRC to release PUCCH/SRS for all serving cells belonging to the Type 2 TAG, clearing any configured downlink assignments and uplink grants if semi-persistent scheduling is allowed to be configured on serving cell, and keep the running TAT associated with Type 2 TAG originating from the anchor eNB as it is.

The UE shall not perform any uplink transmission on a serving cell except the random access preamble transmission when the Type 2 TAG is not UL time aligned to which this serving cell belongs. However, when the Type 2 TAG is not UL time aligned, the UE can still perform uplink transmission on any activated serving cell in another Type 2 TAG which is UL timing aligned.

If the Type 2 TAG is not uplink time aligned, UE shall stop all UL transmission, including the HARQ feedback on all the serving cells belonging to the Type 2 TAG. So the positive or negative acknowledgement generated by the corresponding MAC entity should not be indicated to the physical layer. The generated positive or negative acknowledgement from each MAC entity can only be indicated to the physical layer if the Type 2 TAG is UL time aligned.

Further Optimization for TAT Error Case Handling

Since the uplink time alignment is controlled by the network, whether UE is in or out of uplink synchronization in each Type 2 TAG is known to the corresponding eNB most of the time. Meanwhile, each eNB should know whether the Type 2 TAG originating from and controlled by the other eNB is uplink time aligned or not, which will require some coordination and signaling exchange between each other through the X3/X2 interface.

Due to the loss of TAC command as well as NACK to ACK error, the error case that the UE loss uplink synchronization unintentionally could occur, i.e. the TAT associated with a Type 2 TAG expires while the corresponding eNB which controls the Type 2 TAG doesn't know. For intra-eNB CA, there is no way to informing the error case by the UE to the network, but only relying on networking detection. So the eNB continue scheduling downlink and uplink radio resources through the serving cells belonging to the TAG, which is out of uplink synchronization, until it senses the error case. It will result in radio resources wastage and power consumption.

For inter-eNB CA, when the Type 2 TAG originating from and controlled by one eNB is out of uplink synchronization, the UE can inform RAN through the other eNB with which the uplink time is aligned. So that RAN can knows the occurrence of error case and stop radio resource allocation timely without self-detection. When the TAT associated with a Type 2 TAG originating from and controlled by one eNB expires, the UE checks whether the uplink synchronization with the other eNB is maintained or not. If the UE is still uplink time aligned with the other eNB, the UE will send an indication to it informing that it has lost uplink synchronization with one eNB.

Figure 12:
FIG. 12 illustrates a MAC CE for TAT expiration indication.

The indication can be sent through MAC CE, one example of which can be illustrated in FIG. 12. FIG. 12 illustrates a MAC CE for TAT expiration indication. A new LCID will be assigned to it. If inter-eNB CA with only two eNBs is supported, the MAC CE can be designed without any content. So when the TAT associated with the Type 2 TAG originating from the anchor eNB expires and the TAT associated with the other Type 2 TAG originating from the drift eNB is still running, UE will send an indication to the drift eNB with the new LCID informing that the TAT associated with Type 2 TAG originating from the anchor eNB expires. When the TAT associated with the Type 2 TAG originating from the drift eNB expires and the TAT associated with the Type 2 TAG originating from the anchor eNB is still running, UE will send an indication to the anchor eNB with the new LCID informing that TAT associated with the Type 2 TAG originating from the drift eNB expires. Or a bitmap or a field for TAG ID can be used to indicate which Type 1 TAG/Type 2 TAG is out of uplink synchronization. When inter-eNB CA is configured and both the serving cells originating from the anchor eNB and the drift eNB are in the status of activation. UE maintains uplink time alignment with both the anchor eNB and the drift eNB through uplink transmission timing adjustment based on the received TAC MAC CE and detects the TAT expiration associated with each Type 2 TAG.

If the Type 2 TAG originating from the anchor eNB is not UL time aligned, UE will send an indication for TAT expiration to the drift eNB informing that the uplink with the anchor eNB is not time aligned. If the Type 2 TAG originating from the drift eNB is not UL time aligned before uplink is recovered with the anchor eNB, the whole procedure ends, which means UE totally loss uplink synchronization with both the anchor eNB and the drift eNB. Otherwise, data transmission through the drift eNB is performed normally. If MAC CE for TAT expiry is received for the Type 2 TAG originating from the drift eNB, UE will force the TAT associated with the Type 2 TAG expire, i.e. the whole procedure ends. Meanwhile, UE will also monitor PDCCH order for RA procedure on PCell if the anchor eNB wants to restore the uplink time alignment. If PDCCH order is received, RA procedure on PCell will be performed. If RA procedure is successfully completed, UE will begin to maintain uplink time alignment with both the anchor eNB and the drift eNB.

If the Type 2 TAG originating from the anchor eNB is not UL time aligned. The UE send the indication to the drift eNB informing that the uplink synchronization with the anchor eNB is lost. Upon reception of the indication, the drift eNB sends an indication to the anchor eNB informing that the anchor eNB has lost uplink synchronization with a specific UE. The anchor eNB responds to the drift eNB that whether it intentionally lost the uplink synchronization or not. Meanwhile, if the uplink synchronization to the UE is lost unintentionally, the anchor eNB can stop downlink and uplink data transmission to the UE and trigger random access procedure on PCell to re-obtain the uplink time alignment. Otherwise, the anchor eNB confirms with the drift eNB that it lost the uplink synchronization with the UE intentionally. Some coordination between the anchor eNB and the drift eNB may also involve, which decides whether data transmission on the drift eNB should be continued or not. If the network decides the data transmission through the drift eNB continues, the drift eNB can transmit the TAC to the UE as normal. Otherwise, the drift eNB can transmit a MAC CE for TAT expiry to make the TAT associated with the drift eNB expire. Upon reception of the MAC CE for TAT expiry, the UE forces the TAT associated with the Type 2 TAG originating and controlled by the drift eNB to be expired.

Figure 14A:
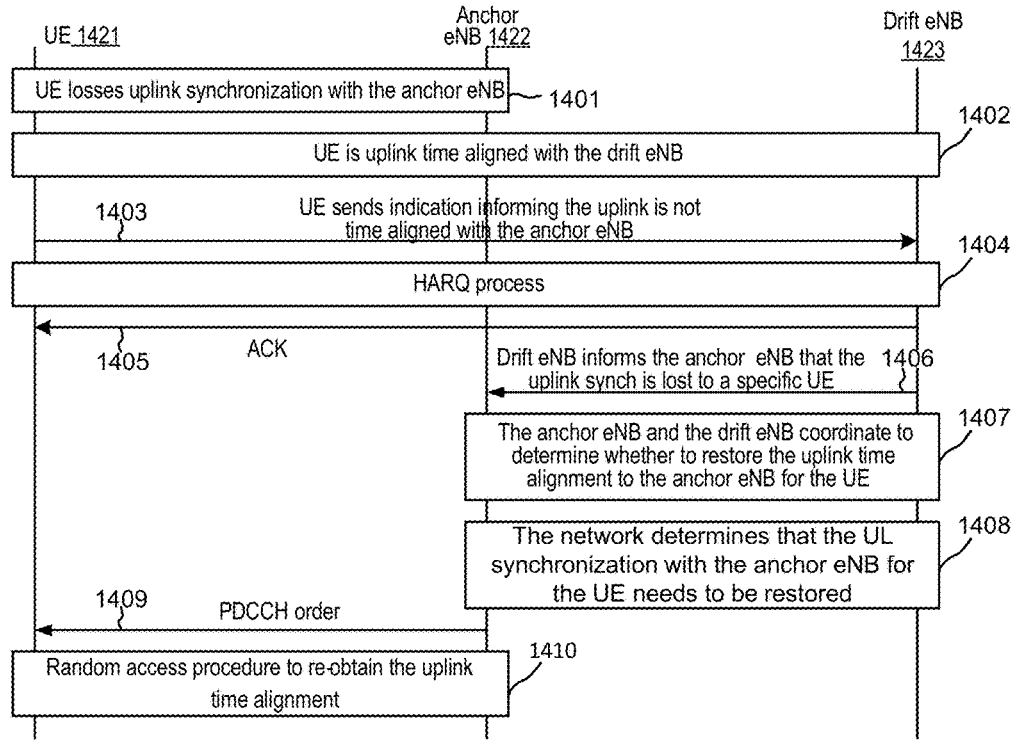
FIG. 14A is an exemplary flow chart illustrating procedures when TAT associated anchor Type 2 TAG with the anchor eNB unintentionally expires while the uplink to the drift eNB is aligned.
Figure 14:
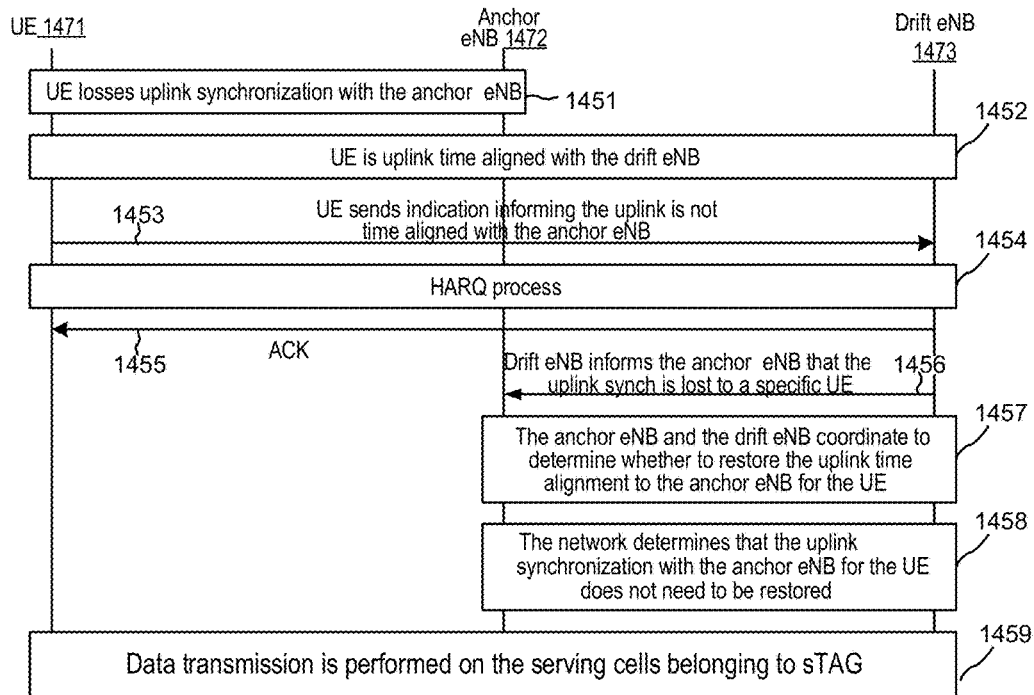
FIG. 14B is an exemplary flow chart illustrating procedures when TAT associated Type 2 TAG with the anchor eNB intentionally expires while the uplink to the drift eNB is aligned.

Examples of the procedure performed at the network side is illustrated in FIGS. 14A and 14B. FIG. 14A is an exemplary flow chart illustrating procedures when TAT associated Type 2 TAG with the anchor eNB unintentionally expires while the uplink to the drift eNB is aligned. UE 1421 is configured with inter-eNB CA. At Step 1401, UE 1421 detects that UE loses uplink synchronization with anchor eNB 1422. At Step 1402, UE 1421 determines that UE is uplink time aligned with drift eNB 1423. At Step 1403, UE 1421 sends indication to drift eNB 1423 informing the uplink is not time aligned with anchor eNB 1422. At Step 1404, HARQ process proceeds. At Step 1405, UE 1421 receives ACK from drift eNB 1423. At Step 1406, drift eNB 1423 informs anchor eNB 1422 that the uplink synchronization is lost to a specific UE. At Step 1407, anchor eNB 1422 and drift eNB 1423 coordinate to determine whether to restore the uplink time alignment to anchor eNB for the UE. At Step 1408, the network determines that the UL synchronization with anchor eNB 1422 for the UE needs to be restored. At Step 1409 UE 1421 received PDCCH order from anchor eNB 1422. At Step 1410, UE 1421 performs random access procedure to re-obtain the uplink time alignment.

FIG. 14B is an exemplary flow chart illustrating procedures when TAT associated Type 2 TAG with the anchor eNB intentionally expires while the uplink to the drift eNB is aligned. At Step 1451, UE 1471 detects that UE loses uplink synchronization with anchor eNB 1472. At Step 1452, UE 1471 determines that UE is uplink time aligned with drift eNB 1473. At Step 1453, UE 1471 sends indication to drift eNB 1473 informing the uplink is not time aligned with anchor eNB 1472. At Step 1454, HARQ process proceeds. At Step 1455, UE 1471 receives ACK from drift eNB 1473. At Step 1456, drift eNB 1473 informs anchor eNB 1472 that the uplink synchronization is lost to a specific UE. At Step 1457, anchor eNB 1472 and drift eNB 1473 coordinate to determine whether to restore the uplink time alignment to anchor eNB for the UE. At Step 1458, the network determines that the UL synchronization with anchor eNB 1472 for the UE does not needs to be restored. At Step 1459, UE 1471 performs data transmission on the serving cells belonging to sTAG.

If TAT associated with Type 2 TAG originating from the drift eNB expires, UE will send an indication for TAT expiration to the anchor eNB informing that the uplink with the drift eNB is not time aligned. If Type 2 TAG originating from the anchor eNB is not UL time aligned before uplink is recovered with the drift eNB, the whole procedure ends, which means UE totally loss uplink synchronization with both the anchor eNB and the drift eNB. Otherwise, data transmission through the anchor eNB is performed normally. If MAC CE for TAT expiry is received for the Type 2 TAG originating from the anchor eNB, UE will force the TAT associated with the Type 2 TAG expire, i.e. the whole procedure ends. Meanwhile, UE will also monitor serving cell activation command for serving cell activation if the network wants to restore the uplink time alignment with the drift eNB. If the serving cell originating from the drift eNB is activated, RA procedure can be triggered and performed on the serving cell to obtain the uplink time alignment. If RA procedure is successfully completed, UE will begin to maintain uplink time alignment with both the anchor eNB and the drift eNB.

Figure 15A:
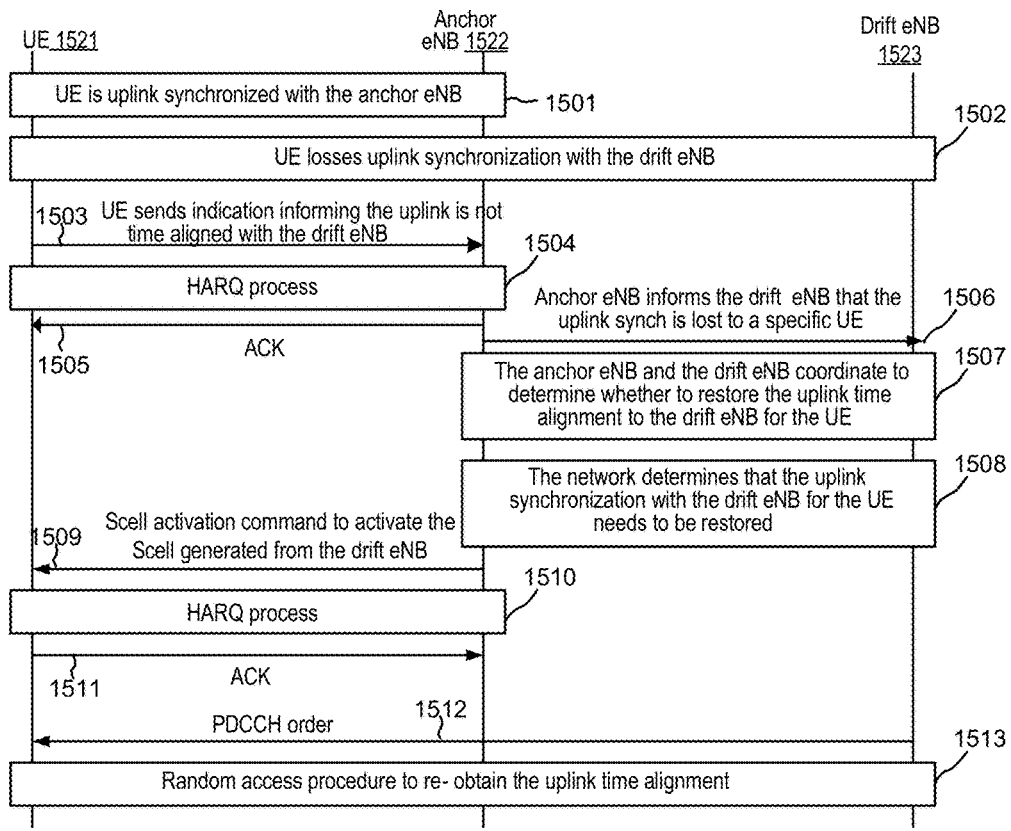
FIG. 15A is an exemplary flow chart illustrating procedures when TAT associated Type 2 TAG with the drift eNB unintentionally expires while the uplink to the anchor eNB is aligned. UE 1521 is configured with inter-eNB CA.
Figure 15B:
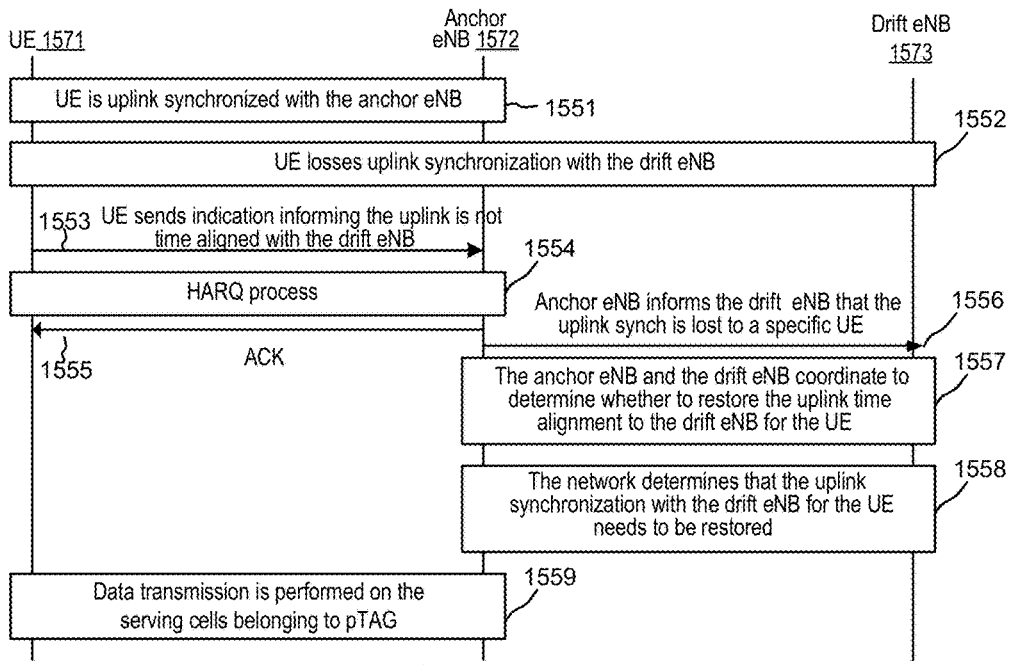
FIG. 15B is an exemplary flow chart illustrating procedures when TAT associated Type 2 TAG with the drift eNB intentionally expires while the uplink to the anchor eNB is aligned.

Examples of the procedure performed at the network side is illustrated in FIGS. 15A and 15B. FIG. 15A is an exemplary flow chart illustrating procedures when TAT associated Type 2 TAG with the drift eNB unintentionally expires while the uplink to the anchor eNB is aligned. UE 1521 is configured with inter-eNB CA. At Step 1501, UE 1521 is uplink synchronized with anchor eNB 1522. At Step 1502, UE 1521 determines that UE loses uplink synchronization with drift eNB 1523. At Step 1503, UE 1521 sends indication to anchor eNB 1522 informing the uplink is not time aligned with drift eNB 1523. At Step 1504, HARQ process proceeds. At Step 1505, UE 1521 receives ACK from anchor eNB 1522. At Step 1506, anchor eNB 1522 informs drift eNB 1523 that the uplink synchronization is lost to a specific UE. At Step 1507, anchor eNB 1522 and drift eNB 1523 coordinate to determine whether to restore the uplink time alignment to anchor eNB for the UE. At Step 1508, the network determines that the UL synchronization with drift eNB 1523 for the UE needs to be restored. At Step 1509, anchor eNB 1522 sends Scell activation command to UE 1521 to activate the Scell generated from drift eNB 1523. At Step 1510 HARQ process proceeds. At Step 1511, UE 1521 sends ACK to anchor eNB 1522. At Step 1521, drift eNB 1523 sends PDCCH order to UE 1521. At Step 1513, UE 1521 random access procedure to re-obtain the uplink time alignment with drift eNB 1523.

FIG. 15B is an exemplary flow chart illustrating procedures when TAT associated Type 2 TAG with the drift eNB intentionally expires while the uplink to the anchor eNB is aligned. At Step 1551, UE 1571 is uplink synchronized with anchor eNB 1572. At Step 1552, UE 1571 determines that UE loses uplink synchronization with drift eNB 1573. At Step 1553, UE 1571 sends indication to anchor eNB 1572 informing the uplink is not time aligned with drift eNB 1573. At Step 1554, HARQ process proceeds. At Step 1555, UE 1571 receives ACK from anchor eNB 1572. At Step 1556, anchor eNB 1572 informs drift eNB 1573 that the uplink synchronization is lost to a specific UE. At Step 1557, anchor eNB 1572 and drift eNB 1573 coordinate to determine whether to restore the uplink time alignment to anchor eNB for the UE. At Step 1558, the network determines that the UL synchronization with drift eNB 1573 for the UE does not need to be restored. At Step 1559, UE 1571 performs data transmission on the serving cells belonging to pTAG.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
   detecting an inter-eNB carrier aggregation configuration by a user equipment (UE) in a wireless network with serving cells served by a first and a second base station, wherein each serving cell is configured with an uplink group identifier;
   determining a first cell group with a first cell group identifier and a second cell group with a second cell group identifier, wherein the first cell group containing one or more serving cells with the same or different uplink group identifiers served by the first base station and the second cell group with the second cell group identifier containing one or more serving cells with the same or different uplink group identifiers served by the second base station, and wherein the uplink group identifier is associated with a cell time advancing group (TAG) and the cell group identifier is associated with a group TAG, and wherein each cell TAG associates with the same base station belongs to the same group TAG, and wherein each cell TAG has a time advance timer (TAT); and
   performing uplink alignment, monitoring and management procedures linking to the first or the second cell group identifier.

2. The method of claim 1, further comprising:
   associating a first MAC entity with the first cell group identifier; and
   associating a second MAC entity with the second cell group identifier.

3. The method of claim 1, wherein the first base station is an anchor base station and the second base station is a drift base station.

4. The method of claim 1, wherein the UE determines a cell group identifier to a serving cell based on a signaling command from the wireless network, and wherein the signaling command is associated with the serving cell and the cell group identifier.

5. The method of claim 1, wherein the UE determines a cell group identifier to a serving cell based on an eNB ID that the serving cell is associated with, and wherein the UE derives the eNB ID either through a predefined serving cell configuration or through resolving an E-UTRAN Cell Global Identifier (ECGI) of the serving cell.

6. The method of claim 1, the step of performing uplink alignment further comprising:
   obtaining initial uplink time alignment through a random access procedure;
   monitoring timing advance commands (TAC) associated with cell TAGs; and
   determining if the group TAG is uplink synchronized.

7. The method of claim 6, wherein the group TAG is uplink synchronized when the UE detects one or more conditions comprising: all cell TAGs in the group TAG is uplink synchronized, a serving cell with PUCCH in the group TAG is uplinked synchronized, and a primary cell TAG in the group TAG is uplink synchronized.

8. The method of claim 6, wherein the group TAG is not uplink synchronized if the UE detects one or more conditions comprising: all cell TAGs in the group TAG are not uplink synchronized, a serving cell with PUCCH in the group TAG is not uplinked synchronized, and the primary cell TAG in the group TAG is not uplink synchronized.

9. The method of claim 6, further comprising:
stopping all running TATs belonging to the group TAG when the group TAG is not uplink synchronized; and
continuing running TATs not belonging to the non-synchronized group TAG.

10. The method of claim 9, further comprising:
notifying the first base station a failure of the second base station when the group TAG associated with the second base station is no longer uplink synchronized.

11. A user equipment (UE), comprising:
a transceiver that transmits and receives radio signals;
a processor configured to execute function modules, wherein the function modules comprise:
an inter-eNB carrier aggregation (CA) module that detects an inter-eNB CA and assigns serving cells with uplink group identifiers, wherein the serving cells are served by a first or a second base station in a wireless network;
a cell-group module that retrieves a first cell group with a first cell group identifier containing one or more serving cells with the same or different uplink group identifiers served by the first base station and a second cell group with a second cell group identifier containing one or more serving cells with the same or different uplink group identifiers served by the second base station, and wherein the uplink group identifier is associated with a cell time advancing group (TAG) and the cell group identifier is associated with a group TAG, and wherein each cell TAG associates with the same base station belongs to the same group TAG, and wherein each cell TAG has a time advance timer (TAT); and
an uplink control module that performs uplink alignment, monitoring and management procedures linking to the first or the second cell group identifier.

12. The UE of claim 11, further comprising:
a first MAC entity, wherein the first MAC entity is associated with the first cell group identifier; and
a second MAC entity, wherein the second MAC entity is associated with the second cell group identifier.

13. The UE of claim 11, wherein the first base station is an anchor base station and the second base station is a drift base station.

14. The UE of claim 11, wherein the cell-group module determines a cell group identifier to a serving cell based on a signaling command from the wireless network, and wherein the signaling command is associated the serving cell with the cell group identifier.

15. The UE of claim 11, wherein the cell-group module assigns a cell group identifier to a serving cell based on an eNB ID that the serving cell is associated with, and wherein the UE derives the eNB ID either through a predefined serving cell configuration or through resolving an E-UTRAN Cell Global Identifier (ECGI) of the serving cell.

16. The UE of claim 11, wherein function modules to be executed by the processor further comprises:
an uplink alignment module that obtains initial uplink time alignment through a random access procedure;
a monitoring module that monitors timing advance commands (TAC) associated with cell TAGs; and
a group TAG detection module that determines if the group TAG is uplink synchronized.

17. The UE of claim 16, wherein the group TAG is uplink synchronized when the group TAG detection module detects one or more the conditions comprising: all cell TAGs in the group TAG is uplink synchronized, a serving cell with PUCCH in the group TAG is uplinked synchronized, and a primary cell TAG in the group TAG is uplink synchronized.

18. The UE of claim 16, wherein the group TAG is not uplink synchronized when the group TAG detection module detects one or more the conditions comprising: all cell TAGs in the group TAG are not uplink synchronized, a serving cell with PUCCH in the group TAG is not uplink synchronized, and a primary cell TAG in the group TAG is not uplink synchronized.

19. The UE of claim 16, wherein the group TAG detection module stops all running TATs belonging to a group TAG when the group TAG is not uplink synchronized; and continues running TATs not belonging to the non-synchronized group TAG.

20. The UE of claim 16, wherein function modules to be executed by the processor further comprises:
a signaling module that notifies the first base station a failure of the second base station when the group TAG associated with the second base station is no longer uplink synchronized.

* * * * *